United States Patent [19]

Nakata et al.

[11] Patent Number: 5,625,539
[45] Date of Patent: Apr. 29, 1997

[54] METHOD AND APPARATUS FOR CONTROLLING A DC TO AC INVERTER SYSTEM BY A PLURALITY OF PULSE-WIDTH MODULATED PULSE TRAINS

[75] Inventors: Hirofumi Nakata, Nara-ken; Hirokazu Kodama, Gose; Tsukasa Takebayashi, Yamatotakada; Satoru Fujii, Nara-ken; Kozo Hiyoshi, Amagasaki, all of Japan

[73] Assignee: Sharp Kabushiki Kaisha, Osaka, Japan

[21] Appl. No.: 438,551

[22] Filed: May 10, 1995

[30] Foreign Application Priority Data

May 30, 1994 [JP] Japan ..................... 6-116309
Jul. 4, 1994 [JP] Japan ..................... 6-151996

[51] Int. Cl.[6] .............................. H02M 3/335
[52] U.S. Cl. ................... 363/17; 363/98; 363/132
[58] Field of Search ........................ 363/15, 17, 34, 363/37, 95, 98, 132, 136

[56] References Cited

U.S. PATENT DOCUMENTS

| | | | |
|---|---|---|---|
| 4,967,334 | 10/1990 | Cook et al. | 363/34 |
| 5,018,058 | 5/1991 | Ionescu et al. | 363/34 |
| 5,208,738 | 5/1993 | Jain | 363/17 |
| 5,400,235 | 3/1995 | Carroll | 363/17 |
| 5,504,667 | 4/1996 | Tanaka et al. | 363/37 |

OTHER PUBLICATIONS

Contractor Report "Design & Construction of an Advanced Power Conditioning Subsystem for Small Photovoltaic Applications" printed Mar. 1985 Steigerwold et al.
Proceedings of JSES/JWEA Joint Conference (1994) by Japan Solar Energy Society & Japan Wind Energy Association on Dec. 8 and 9, 1994.
1994 National Convention Record I.E.E. Japan–Industry Application Society–issued Aug. 1994.

Primary Examiner—Peter S. Wong
Assistant Examiner—Adolf Berhane

[57] ABSTRACT

A pulse train pulse-width modulated by PWM control using a sine-wave signal and a carrier signal is inverted alternately in positive-negative polarity. With a high-frequency AC signal obtained by the inversion, a primary side of a transformer for insulating input and output from each other is excited. This arrangement makes it possible to employ a high-frequency transformer which has a capacity ratio of about 1/30 and a weight ratio of about 1/20 relative to a commercial-frequency transformer, instead of using it. Thus, an inverter apparatus can be reduced in size and weight as compared with the system using the power-frequency transformer. A sine-wave AC waveform with substantially less distortion similar to the waveform output by the conventional PWM control can be obtained with a simple construction.

19 Claims, 17 Drawing Sheets

Fig.3A

Sine-wave signal (50/60-several hundreds Hz)    Carrier signal (several tens kHz or more)

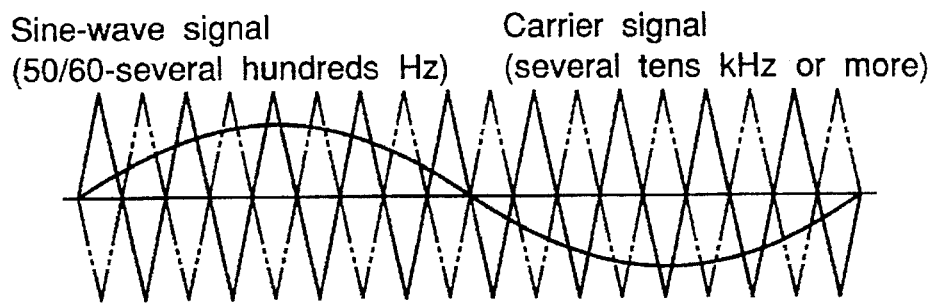

Fig.3B  First pulse train signal A1
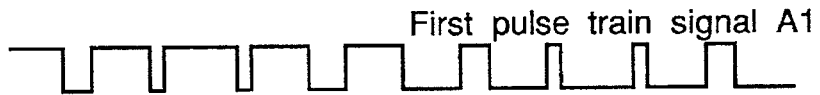

Fig.3C  Second pulse train signal A2
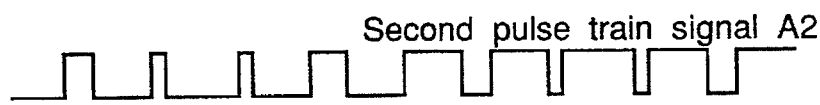

Fig.3D  Third pulse train signal A3

Fig.3E  Fourth pulse train signal A4
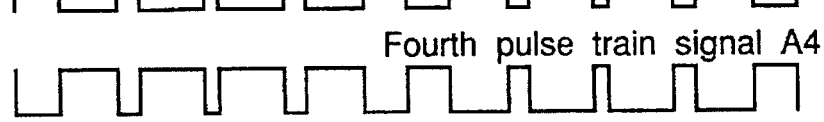

Rectangular-wave signal equal in frequency to the carrier signal and shifted in phase by a 1/4 period against the carrier signal Fig.3F

Fig.3G  Q1   Fifth pulse train signal B1

Fig.3H  Q2   Sixth pulse train signal B2

Fig.3 I  Q3   Seventh pulse train signal B3

Fig.3J  Q4   Eighth pulse train signal B4

Waveform excited on high-frequency transformer

Fig.3K  Ei
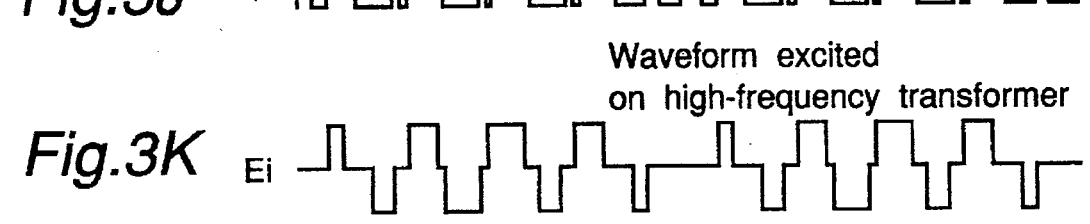

Waveform outputted from the diode bridge

Fig.3L  Eo   Positive
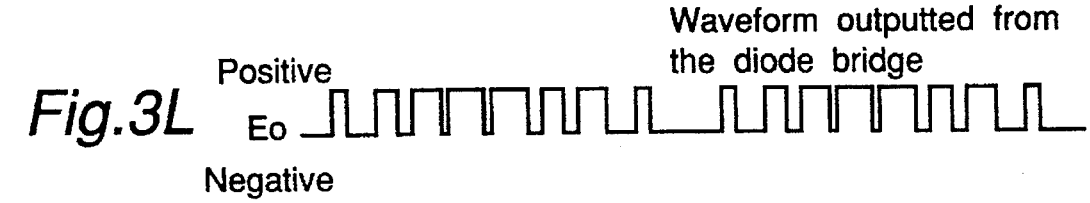
Negative

Fig.6A

Primary side of high-frequency transformer a

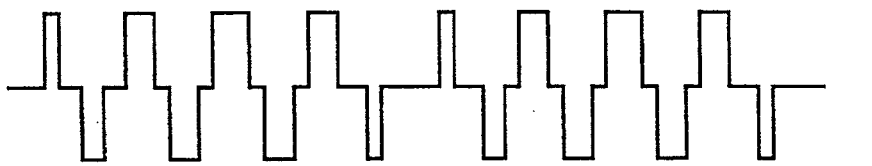

Actually a high-frequency pulse train (several tens kHz)., although schematically illustrated.

Fig.6B

First line voltage A

Voltage waveform

Some pulses are omitted in the drawing, although being actually a high-frequency pulse train (several tens kHz).

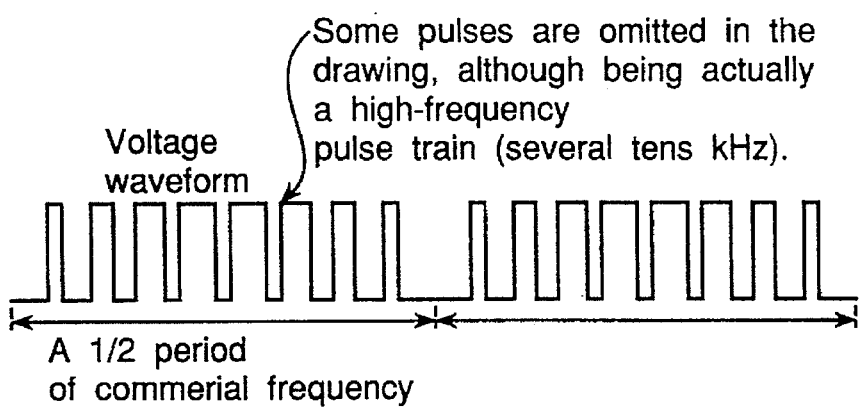

A 1/2 period of commerial frequency

Fig.6C

Second line voltage B

Voltage waveform

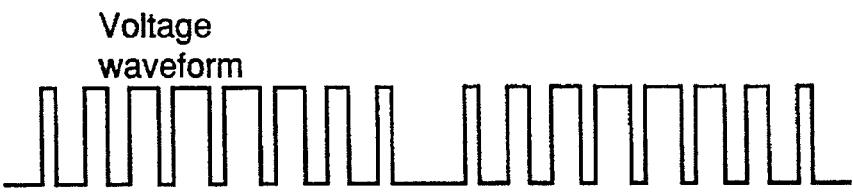

Fig.6D

Third line voltage C

Voltage waveform

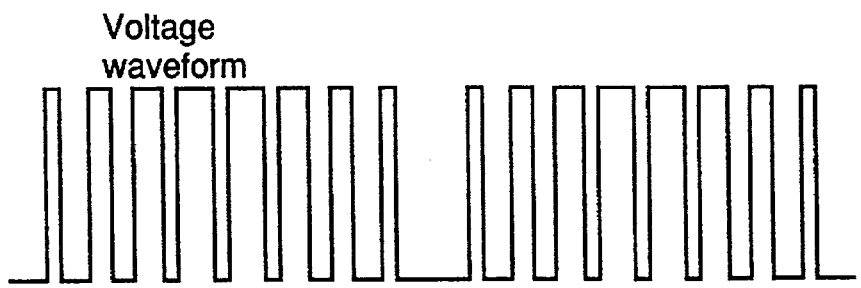

First line voltage V₁

1/100 second (or 1/120 second)   Time →

Second line voltage V₂

Time →

Third line voltage V₃

Time →

First line voltage $V_{11}$

Second line voltage $V_{12}$

Third line voltage $V_{13}$

First line voltage $V_{21}$

Second line voltage $V_{22}$

Third line voltage $V_{23}$

With load balanced

With load unbalanced

METHOD AND APPARATUS FOR CONTROLLING A DC TO AC INVERTER SYSTEM BY A PLURALITY OF PULSE-WIDTH MODULATED PULSE TRAINS

BACKGROUND OF THE INVENTION

1. Field of the Invention

The present invention relates to an inverter apparatus for converting DC power generated by an independent DC power supply such as a solar cell into AC power and supplying the power to home- and business-use general AC loads or to existing commercial power systems and the like.

2. Description of the Prior Art

A conventional inverter apparatus is composed of an inverter bridge made up of several switching devices, a transformer for electrically insulating the DC power source from commercial power systems or loads, a low-pass filter, and a control circuit for performing ON/OFF control on the plurality of switching devices constituting the inverter bridge. As the above transformer, there have been used power-frequency transformers or high-frequency transformers intended for the miniaturization of the apparatus.

First, a conventional example of the inverter apparatus using a power-frequency transformer is described with reference to FIG. 14. DC power outputted from a solar cell 2 is inputted to an inverter apparatus 1. The input DC power is converted into AC power by an inverter bridge 32, and supplied to a commercial power system 3 via a power-frequency transformer 33 which is provided at an output end of the inverter apparatus 1 in order to insulate the solar cell 2 from the commercial power system 3. A DC capacitor 12 for suppressing the input power fluctuating of the inverter apparatus 1 and a DC input current detector 13 are connected in the preceding stage of the inverter bridge 32. An AC filter 16 for removing harmonic components of AC current and an inverter output current detector 14 are connected in the succeeding stage of the inverter bridge 32. Further, an interconnection relay 15 is provided in the succeeding stage of the AC filter 16, whereby interconnection and disconnection with the commercial power system 3 is implemented.

A control circuit 34 of the inverter apparatus 1 is composed of a gate drive circuit 35, a PWM (Pulse Width Modulation) control unit 36, an error amplifier 37, a carrier signal generator 38, a signal processing unit 39, a sine-wave signal storage unit 40, an A/D converter 41, and a D/A converter 42.

The PWM control unit 36 generates a first pulse train signal obtained by comparing a sine-wave signal equal in frequency (50/60-several hundreds Hz) to the voltage waveform of the aforementioned commercial power system 3 with a high-frequency (about 10/kHz, but not lower than 10 kHz) carrier signal synchronized with the sine-wave signal, a second pulse train signal obtained by inverting the first pulse train signal, a third pulse train signal obtained by comparing an inverted carrier signal, which is the inversion of the aforementioned carrier signal, with the sine-wave signal, and a fourth pulse train signal obtained by inverting the third pulse train signal. FIGS. 15B, 15C, 15D and 15E show respective waveforms of these pulse train signals. It is noted that in FIGS. 15A, 15B, . . . , 15F, high-frequency waves of about 10 kHz, but not lower than 10 kHz are schematically illustrated.

These first to fourth pulse train signals are inputted to the gate drive circuit 35. Based on these signals, gate drive signals equal in frequency to the carrier signal are generated for four switching devices Q1 to Q4 constituting the inverter bridge 32. With the gate drive signals, the switching devices Q1 to Q4 are controlled to be turned on and off at the same frequency as that of the carrier signal. As a result, an output pulse train waveform Ei as shown in FIG. 15F is produced by the inverter bridge 32. Further, the output waveform Ei is subjected to a harmonic-component removing process and a smoothing process by the succeeding-stage AC filter 16, resulting in a 50/60-several hundreds Hz sine-wave AC output. The sine-wave AC output undergoes the input-output insulation by the power-frequency transformer 33 and thereafter is inputted to the commercial power system 3. In this case, the power-frequency transformer 33 is excited at a frequency of the 50/60-several hundreds Hz sine-wave AC output.

The A/D converter 41 converts a DC voltage signal $V_{in}$ and a DC current signal $I_{in}$, which are analog signals derived from the solar cell 2, and a utility line voltage signal $V_{out}$ into digital quantities, and then transmits the resulting signals to the signal processing unit 39. In order to maximize the output power from the solar cell 2, the signal processing unit 39 performs a maximum power point tracking operation, by which the solar cell operating point is made coincident with a maximum point on the solar cell output characteristic curve. The signal processing unit 39 also reads out a sine-wave signal (50/60-several hundreds Hz) which serves as a current command value for controlling the inverter apparatus 1, from the sine-wave signal memory unit 40 where a plurality of sine-wave signals having different amplitudes are previously stored. The sine-wave signal storage unit 40 is normally storing the aforementioned sine-wave signals having a plurality of different amplitudes proportional to the amplitude of rated output current waveform of the inverter apparatus 1, as digital quantities quantized in the unit of half the period or one period and every certain time intervals. The D/A converter 42 converts a read sine-wave signal into an analog signal and then transmits it to the error amplifier 37. The error amplifier 37 receives as inputs an inverter output current signal Iout derived from the inverter output current detector 14, and the aforementioned sine-wave signal. The error amplifier 37 compares the two signals with each other to determine an error, and outputs a reference wave signal obtained by amplifying the error, to the PWM control unit 36. The carrier signal generator 38 outputs similarly to the PWM control unit 36 a carrier signal (higher than ten kHz) synchronized with the sine-wave signal. As a result, the output current of the inverter apparatus 1 undergoes a change in response to the sine-wave signal that serves as a current command value. In this case, when the output current of the inverter apparatus 1 is controlled with the above sine-wave signal, AC power with a power factor of 1 can be supplied to the existing commercial power system 3, by providing a sine-wave signal of the same phase and the same frequency (50/60-several hundreds Hz) as the voltage of the commercial power system 3.

Next described is a case where a high-frequency transformer is used. An apparatus employing a power-frequency transformer is disadvantageous in reducing the size and weight of the inverter apparatus because of the large weight and capacity of the power-frequency transformer. With the use of a high-frequency transformer, on the other hand, such problems can be solved. When a high-frequency transformer is used, the transformer needs to be excited at high-frequency voltage. An example using the current instantaneous value control method developed for this purpose is described below with reference to FIG. 16.

An inverter apparatus 100 is inserted between a solar cell 2 and an existing commercial power system 3. The inverter apparatus 100 converts DC power generated by the solar cell 2 into AC power of 50/60 Hz, and supplies the power to loads in grid-connection with the commercial power system 3. In the inverter apparatus 100, the input DC power is converted into high-frequency alternating voltage under the current instantaneous value control by a high-frequency inverter bridge 4 made up of switching devices Q1 to Q4, and fed to the primary side of a high-frequency transformer 5. The high-frequency alternating current is rectified by a diode bridge 6 on the secondary side of the high-frequency transformer 5, and subjected to a harmonic-component removing process and a smoothing process by a filter circuit made up of a DC reactor 7 and a capacitor 47 connected in parallel therewith. Further, the processed current is converted into AC power of commercial frequency under polarity reversing control by a low-frequency inverter bridge 8 made up of switching devices S1 to S4. Then, the power is supplied to the commercial power system 3 via an interconnection relay 55 and an AC filter 16.

A signal processing unit 43 receives as inputs a voltage signal $V_{in}$ of the solar cell 2, a current signal $I_{in}$ detected by a DC input current detector 13, a current (inverter output current) signal $I_t$ on the primary side of the high-frequency transformer 5 detected by an inverter output current detector 14, and a voltage signal $V_{out}$ of the commercial power system 3. The signal processing unit 43 produces as outputs a current command signal and a polarity decision signal. A hysteresis comparator 44 receives as inputs a primary-side current $I_t$ of the high-frequency transformer 5 detected by the inverter output current detector 14 and the aforementioned current command signal. The hysteresis comparator 44 performs via a NOT circuit 45 the control of alternately turning on and off the switching devices Q1, Q4 and Q2, Q3 that constitute the high-frequency inverter bridge 4, so that the primary-side current of the high-frequency transformer 5 is repeatedly reciprocated within a range of a constant width having upper and lower limit values around the current command signal. More specifically, with respect to the current command signal ($I_{REF}$) as shown in FIG. 17, an upper limit value $I^+$ and a lower limit value $I^-$ with a specified width $\Delta I$ are previously given to the hysteresis comparator 44 as set values. Then, the primary-side current signal $I_t$ of the high-frequency transformer 5 in FIG. 16, which is the actual value of the control quantity, is detected by the inverter output current detector 14, and fed to the hysteresis comparator 44 together with the current command signal. When the current signal $I_t$, which is the actual value of control quantity, exceeds the upper limit set value $I^+$ of FIG. 17 ($I^+=I_{REF}+\Delta I$), the switching devices Q1, Q4 of the high-frequency inverter bridge 4 of FIG. 16 are turned off while the switching devices Q2, Q3 are turned on via the NOT circuit 45, so that the current gradient is turned into a decrease. On the other hand, when the current signal $I_t$ of FIG. 17 decreases below the lower limit set value $I^-$ ($I^-=I_{REF}-\Delta I$), the switching devices Q1, Q4 are turned on while the switching devices Q2, Q3 are turned off, so that the current signal $I_t$ increases. By performing such switching control, the actual value of the current signal $I_t$ transits reciprocatingly between $I^+$ and $I^-$ each time the switching operation is effected. In this operation, if a sine-wave signal having the same frequency as the commercial power system 3 and having an arbitrary amplitude is used as the current command signal ($I_{REF}$), the current signal $I_t$ changes repeatedly and reciprocatingly responsive to even very fast switching operation within a range of $\pm \Delta I$ around the current command signal. Thus, a sine-wave current waveform having a commercial frequency and having an amplitude proportional to that of the current command signal can be obtained. As described above, the primary-side current of the high-frequency transformer 5 in the inverter apparatus 100, i.e., the magnitude of the inverter output current can be controlled by the amplitude of the current command signal ($I_{REF}$).

The fold-back control circuit 46 receives as an input the aforementioned polarity decision signal and alternately switches the turn-on and -off of the switching devices S1, S4 and S2, S3 that constitute the low-frequency inverter bridge 8, according to the polarity of the voltage signal $V_{out}$ of the commercial power system 3. By this control, DC power rectified into a full-wave rectified current by the diode bridge 6 is formed into a sine-wave AC output at the succeeding stage of the low-frequency inverter bridge 8.

For reduction in size and weight of the inverter apparatus, a high-frequency transformer is preferably used. The reason is that the high-frequency transformer results in about 1/30 the capacity and about 1/20 the weight of the power-frequency transformer.

However, the above current instantaneous value control method used as a method for exciting the high-frequency transformer with high-frequency voltage, superior as it is, has difficulties in optimizing the setting of the upper and lower limit values of the hysteresis width for the control method. Too large set values result in an increased distortion while too small set values result in a decreased width of the pulse train signal obtained through a comparison between the current command value and the inverter output current. This causes the control system to be more unstable than in the PWM control using the low-frequency transformer. A further problem is that seeking a more stable control system would lead to a more complex control circuit.

SUMMARY OF THE INVENTION

The present invention has been developed with a view to substantially solving the above described disadvantages and has for its essential object to provide a method for controlling an inverter apparatus which allows even waveform distortions of inverter output current to be controlled to substantially lower level without involving troublesome control operations, for the purpose of achieving reduction in size and weight of the inverter apparatus, and to provide an inverter apparatus using the same method.

Another object of the present invention is to provide an inverter apparatus which can be reduced in size and weight by the use of a high-frequency transformer, and which can be easily interconnected with the single-phase three-wire system distribution line by the same electrical system.

A still further object of the present invention is to provide an inverter apparatus which can continue the interconnected operation without halting the inverter apparatus even when any load unbalance has taken place to the single-phase three-wire system distribution line.

In order to achieve the aforementioned object, there is provided a method for controlling an inverter apparatus which converts DC power generated by a DC power supply into AC power and then supplies the AC power to loads or existing commercial power supply, the method comprising steps of:

alternately inverting positive/negative polarity of a pulse train pulse-width modulated by PWM (Pulse Width Modulation) control using a sine-wave signal and a carrier signal; and exciting a primary side of a transformer, where input and output are insulated from each other, with a high-frequency AC signal obtained through the inverting step.

According to the control method of the present invention, a necessary high-frequency AC signal can be obtained only by alternately inverting a pulse-width modulated pulse train. This inversion can be achieved, for example, by driving the gates of switching devices constituting an inverter bridge, with four kinds of pulse train signals.

The method for alternately inverting the positive/negative polarity of the pulse-width modulated pulse train by the above PWM control preferably comprises steps of: obtaining a first pulse train signal by comparing the sine-wave signal and the carrier signal with each other; obtaining a second pulse train signal by inverting the first pulse train signal; obtaining a third pulse train signal by generating an inverted carrier signal, which is an inversion of the carrier signal, and by comparing the inverted carrier signal and the sine-wave signal with each other; obtaining a fourth pulse train signal by inverting the third pulse train signal; generating a rectangular-wave signal which is equal in frequency to the carrier signal and which is shifted in phase by a ¼ period; gating the rectangular-wave signal with the individual pulse train signals of the first to fourth pulse train signals; and performing on-off control on four switching devices constituting an inverter bridge with four pulse train signals obtained by the gating process. The gating process is preferably an exclusive-OR operation, whereby four kinds of pulse train signals are generated. Then, preferably, the four kinds of pulse train signals are fed respectively to the four switching devices constituting the inverter bridge and the switching devices are controlled to be turned on or off, whereby the aforementioned high-frequency AC signal having the same frequency as the carrier signal is obtained. In this case, a 50/60 to several hundreds Hz sine-wave signal and a more than several tens kHz carrier signal are preferably used and the inverter bridge composed of the four switching devices is provided in the inverter apparatus.

Further, the method for obtaining the aforementioned four pulse train signals preferably comprises steps of: generating a first pulse train signal by comparing a sine-wave signal and a carrier signal with each other and by outputting a first level when the sine-wave signal is greater than the carrier signal or outputting a second level when it is smaller; generating a second pulse train signal by inverting the first pulse train signal; generating a third pulse train signal by comparing an inverted carrier signal, which is an inversion of the foregoing carrier signal, with the sine-wave signal and by outputting the first level when the inverted carrier signal is greater than the sine-wave signal or outputting the second level when it is smaller; and generating a fourth pulse train signal by inverting the third pulse train signal. In addition, the first level and the second level mean the so-called "High" level or "Low" level.

With such an arrangement, the high-frequency alternating current having a pulse-width modulated pulse train inverted alternately of the positive and negative polarity becomes equal in frequency to the carrier signal. It is noted that an inverted signal of the sine-wave signal may also be used instead of the inverted signal of the carrier signal. Similar results can be obtained also in this case.

When the primary side of the transformer is controlled so as to be excited with an alternating current having a pulse-width modulated pulse train inverted alternately of the positive and negative polarity as described above, a similar high frequency alternating current having a pulse-width modulated pulse train inverted alternately of the positive and negative polarity, which results from transforming the primary-side voltage, is outputted on the secondary side of the transformer. Thus, this high-frequency alternating current is rectified by a rectifier so as to be converted into a pulse-width modulated pulse train output continuous on one side.

In the above-described method of the present invention, the high-frequency alternating current excited on the secondary side of the transformer is preferably rectified by a rectifier (AC-to-DC converter) so as to be converted into a pulse-width modulated pulse train output continuous in one polarity.

The inverter apparatus that makes it feasible to implement the above-described inverter control method of the present invention comprises:

a first power conversion unit for converting DC voltage into AC voltage;

a transformer for obtaining a transformed secondary voltage with the resulting AC voltage taken as a primary voltage;

a second power conversion unit to which secondary-side two lines of the transformer are connected and which serves for converting AC voltage into DC voltage;

reactors connected in series to each of two output lines of the second power conversion unit;

a third power conversion unit connected to outputs of the reactors and converting DC voltage into AC voltage; and a control circuit for controlling turn-on and off of switching devices constituting the first power conversion unit and the third power conversion unit, the control circuit comprising:

means for generating a sine-wave signal which is an output target value of the inverter apparatus;

means for generating a carrier signal for performing PWM control using the sine-wave signal;

means for generating a rectangular-wave signal equal in frequency to the carrier signal and shifted in phase by a ¼ period;

pulse train signal generating means for generating a first pulse train signal by comparing the sine-wave signal and the carrier signal with each other and by outputting a first level when the sine-wave signal is greater than the carrier signal, or outputting a second level when the sine-wave signal is smaller than the carrier signal; generating a second pulse train signal by inverting the first pulse train signal; generating a third pulse train signal by comparing an inverted carrier signal, which is an inversion of the carrier signal, and the sine-wave signal with each other and by outputting the first level when the inverted carrier signal is greater than the sine-wave signal, or outputting the second level when the inverted carrier signal is smaller than the sine-wave signal; and generating a fourth pulse train signal by inverting the third pulse train signal;

means for gating the first to fourth pulse train signals with the rectangular-wave signal; and means for performing ON-OFF control on the switching devices constituting the first power conversion unit with the gated pulse train signals.

The first power conversion unit is preferably a high-frequency inverter bridge that converts a DC input into a high-frequency alternating current (ten kHz or more). The transformer is preferably a high-frequency transformer that insulates the input side from the output side of the high-frequency inverter bridge. The second power conversion unit is preferably a diode bridge for rectifying the high-frequency alternating current at the output end of the high-frequency transformer.

Also, preferably, the reactor smooths a rectified waveform to remove high-frequency components, and the third power conversion unit is a low-frequency inverter bridge that performs fold-back control with low frequency (e.g., 50/60 to several hundreds Hz). In addition, the reactor may be provided on the preceding stage of the third power conversion unit.

According to the above-described inverter apparatus, the apparatus adopts an inverter control method in which the primary side of the high-frequency transformer is excited by a high-frequency alternating current which has a pulse-width modulated pulse train inverted alternately of the positive and negative polarity and which is equal in frequency to the carrier signal. As a result, the secondary-side output waveform of the high-frequency transformer also has a high-frequency AC waveform having a pulse-width modulated pulse train inverted alternately of the positive and negative polarity. Accordingly, the diode bridge provided at the succeeding stage of the high-frequency transformer rectifies the pulse-width modulated, alternately positive-negative inverted pulse train signal, whereby a PWM pulse train waveform continuous on the positive side is obtained. Then, the waveform is smoothed by the DC reactor provided at the succeeding stage of the diode bridge, whereby high-frequency components are removed. Thus, a DC waveform similar to one which results from full-wave rectifying a sine-wave AC waveform of the same frequency as the sine-wave signal can be obtained. Further, in the commercial-frequency inverter bridge at the succeeding stage, fold-back control is performed in which a DC waveform similar to the result of full-wave rectifying the sine-wave AC waveform is inverted alternately of the positive and negative polarity, whereby a sine-wave AC waveform can be obtained.

More preferably, the above-described inverter apparatus is provided with a center tap on the secondary side of the transformer. In this case, the line from the center tap is connected to the neutral line of the low-voltage single-phase three-wire system distribution line, the reactor is connected to the two output lines of the second power conversion unit, capacitors are connected up-and-down symmetrically between the respective two lines and the line from the center tap, and the two output lines of the third power conversion unit are connected to the respective lines of the low-voltage single-phase three-wire system distribution line other than the neutral line.

With such an arrangement, as a center tap is provided on the secondary side of the high-frequency transformer, three output lines can be obtained by the center tap and other two output lines on the secondary side of the high-frequency transformer. Further, two line voltages of the same voltage are generated between the center tap and the other two output lines, while a line voltage two times as much as the foregoing line voltage is generated between the two lines other than the center tap. That is, three line voltages in total can be obtained. Then, these three line voltages are interconnected with the low-voltage single-phase three-wire system distribution line of the commercial power system. However, the three line voltages on the secondary side of the high-frequency transformer are not of the sine-wave waveform of the commercial power system, but each of a high-frequency AC waveform having a pulse-width modulated pulse train inverted alternately of the positive and negative polarity as described above. For this reason, the three line voltages are once rectified by the diode bridge of the above-described construction, and smoothed by a filter circuit composed of a DC reactor and a capacitor, so as to be shaped into a DC voltage waveform with high-frequency components removed (a waveform that results from full-wave rectifying the sine wave of the commercial frequency). Further, by the fold-back control of the low-frequency inverter bridge, a sine-wave AC waveform of commercial frequency is obtained.

By the above action, the present inverter apparatus allows a high-frequency transformer to be used instead of a power-frequency transformer, so that the apparatus can be reduced in size and weight. Also, a stable sine-wave AC waveform can be obtained by quite a simple control method that involves only adding gate processing, typically exclusive-OR operation, to the conventional PWM control. Moreover, an interconnected operation with the low-voltage single-phase three-wire system distribution line of the commercial power system can be performed with three output lines having three line voltages (e.g., 100 VAC, 100 VAC, 200 VAC).

In one embodiment of the present invention, there is further provided a current detector provided between the secondary-side center tap of the transformer and the neutral line of the single-phase three-wire system distribution line and detecting a transient current; and a first control unit for performing ON-OFF control on switching devices provided in the third power conversion unit for converting DC power into AC power so that the transient current will not flow, based on a direction of the transient current detected by the current detector.

According to the above embodiment, a transient current flowing through the neutral line is detected by the current detector inserted between the neutral line of the single-phase three-wire system distribution line and the center tap of the transformer. Then, based on the direction of the transient current detected by the current detector, the first control unit controls the turn-on and -off of the switching devices of the third power conversion unit so that the transient current will not flow. For example, if there is a shift of the turning-on and -off time due to variations in characteristics of the switching devices, the shift can be corrected by adjusting the turning-on and -off time of the switching devices, whereby the transient current can be prevented from flowing through the neutral line of the single-phase three-wire system distribution line.

Accordingly, this inverter apparatus can produce a stable AC voltage with low distortion.

In one embodiment of the present invention, there is further provided a voltage detector for detecting line voltages between the neutral line and the two voltage lines of the single-phase three-wire system distribution line; a circuit breaker provided between the center tap of the transformer and the neutral line of the single-phase three-wire system distribution line; and a second control unit for performing control so as to open the circuit breaker when the transient current detected by the current detector is equal to or greater than a specified value, and to close the circuit breaker when a voltage difference between the line voltages detected by the voltage detector is smaller than the specified value.

According to the above embodiment, the voltage detector detects line voltages between the neutral line and the two voltage lines of the single-phase three-wire system distribution line. The second control unit opens the circuit breaker provided between the center tap of the transformer and the neutral line of the single-phase three-wire system distribution line when the transient current detected by the current detector is greater than a specified value, whereas it closes the circuit breaker when the voltage difference between the line voltages detected by the voltage detector is lower than a specified value. Accordingly, when loads connected between the neutral line and the two voltage lines of the single-phase three-wire system distribution line are balanced, interconnected operation is performed with the single-phase three-wire system distribution line of the commercial power system. On the other hand, when the loads are unbalanced, i.e., when the transient current detected by the current detector becomes greater than the specified value, the control unit opens the circuit breaker to thereby disconnect only the neutral line of the single-phase three-wire system distribution line so that the interconnected operation is continued with the single-phase two wire system utility line in which only the voltage lines of the distribution line are connected. Then, when the voltage difference between the line voltages detected by the voltage detector becomes lower than the specified value, it is decided that the loads have restored their balanced state, where the control unit closes the circuit breaker to connect the neutral line of the single-phase three-wire system distribution line with the center tap of the transformer, so that the interconnected operation is continued with the single-phase three-wire system distribution line.

Consequently, in normal state, interconnection is achieved between the single-phase three-wire system distribution line and three output lines, so that an interconnection matched to the distribution method of the commercial power system can be achieved. On the other hand, when the loads become unbalanced, only the neutral line of the single-phase three-wire system distribution line is disconnected, whereby the switching devices and the like are prevented from damage due to load unbalance. Moreover, the interconnected operation can be continued with the single-phase two wires without halting the system operation, so that the commercial power system can be supplied with power from the solar cell efficiently.

In one embodiment of the present invention, there is further provided a voltage detector for detecting line voltages between the neutral line and the two voltage lines of the single-phase three-wire system distribution line; a circuit breaker provided between the center tap of the transformer and the neutral line of the single-phase three-wire system distribution line; and a second control unit for performing control so as to open the circuit breaker when a voltage difference between the line voltages detected by the voltage detector is equal to or greater than a specified value, and to close the circuit breaker when the voltage difference is smaller than the specified value.

According to the above embodiment, the line voltages between the neutral line and the two voltage lines of the single-phase three-wire system distribution line are detected. Then, the second control unit opens the circuit breaker provided between the center tap of the transformer and the neutral line of the single-phase three-wire system distribution line when the voltage difference between the line voltages detected by the voltage detector is greater than a specified value, whereas it closes the circuit breaker when the voltage difference is lower than the specified value. Accordingly, when the loads connected between the neutral line and the voltage lines of the single-phase three-wire system distribution line are balanced, interconnected operation is performed with the single-phase three-wire system distribution line of the commercial power system. On the other hand, when the loads become unbalanced, i.e., when the voltage difference between the line voltages detected by the voltage detector is not less than the specified value, the second control unit opens the circuit breaker to disconnect only the neutral line of the single-phase three-wire system distribution line, so that the interconnected operation is continued with the single-phase two wires in which only the voltage lines of the distribution line are connected. Then, when the voltage difference between the line voltages detected by the voltage detector becomes lower than the specified value, it is decided that the loads have restored their balanced state, where the second control unit closes the circuit breaker so that the neutral line of the single-phase three-wire system distribution line is connected to the center tap of the transformer. Thus, the interconnected operation is continued with the single-phase three-wire system distribution line.

Consequently, in normal state, the interconnection is achieved between the single-phase three-wire system distribution line and three output lines, so that an interconnection matched to the commercial power system method can be achieved. On the other hand, when the loads become unbalanced, only the neutral line of the single-phase three-wire system distribution line is disconnected, whereby the switching devices and the like are prevented from damage due to load unbalance. Moreover, the interconnected operation can be continued with the single-phase two wires without halting the system operation, so that the commercial power system can be supplied with power from the solar cell efficiently.

In one embodiment of the present invention, there is provide an interconnection type inverter apparatus for converting DC power fed from a DC power supply into AC power and supplying the AC power to a single-phase three-wire system distribution line having two voltage lines and a neutral line of a commercial power system, the inverter apparatus comprising:

a first power conversion unit for converting the DC power derived from the DC power supply into AC power;

a transformer for transforming the resulting AC voltage derived from the first power conversion unit and outputting the transformed AC voltage from secondary-side output terminals of the transformer, in which a center tap provided at a generally midpoint of a winding of the secondary-side output terminals is connected to the neutral line of the single-phase three-wire system distribution line;

a second power conversion unit for converting AC power derived from the secondary-side output terminals of the transformer into DC power;

filter circuits for removing high-frequency components superimposed on the DC voltage derived from the second power conversion unit; and a third power conversion unit for converting DC power derived from the filter circuits into AC power, the third power conversion unit having output terminals connected to the two voltage lines of the single-phase three-wire system distribution line, respectively.

According to the above inverter apparatus, the first power conversion unit converts DC power fed from the DC power supply into AC power. Then, the transformer transforms the AC voltage derived from the first power conversion unit, and outputs the transformed AC voltage from the secondary-side output terminal. Next, the second power conversion unit converts AC power derived from the secondary-side output terminal of the transformer into DC power. Thereafter, high-frequency components superimposed on the DC voltage outputted from the second power conversion unit are removed by the filter circuit. The third power conversion unit converts the DC power derived from the filter circuit into AC power, and outputs a line voltage between the two voltage lines of the single-phase three-wire system distribution line connected to the output terminal of the third power conversion unit. Further, since the center tap provided at a generally midpoint of the secondary-side winding of the transformer is connected to the neutral line of the single-phase three-wire system distribution line, the third power conversion unit outputs line voltages between the respective voltage lines and the neutral line. That is, generally equal line voltages are generated between the respective voltage lines and the neutral line of the single-phase three-wire system distribution line, and a voltage approximately two times as much as the line voltages is generated between the two voltage lines.

Accordingly, the inverter apparatus of the above embodiment can be reduced in size and weight by virtue of using a high-frequency transformer in place of the power-frequency transformer having two input lines and three output lines. Moreover, interconnected operation with the single-phase three-wire system distribution line of the commercial power system can be implemented with three output lines having three line voltages.

In one embodiment of the present invention, the filter circuits are respectively composed of a reactor whose one end is connected to one of the DC voltage output terminals of the second power conversion unit, and a capacitor connected between the other end of the reactor and the center tap of the transformer.

According to the above embodiment, the filter circuits respectively composed of the reactor and the capacitor remove high-frequency components superimposed on the DC voltages between the two DC voltage output terminals of the second power conversion unit and the center tap of the transformer.

Accordingly, waveform shaping can be accomplished by removing high-frequency components of the DC voltage derived from the second power conversion unit by the above filter circuits of simple construction.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3A shows waveforms of a sine-wave signal and a carrier signal, FIGS. 3B, 3C, 3D, . . . , 3J show waveforms of pulse train signals, FIG. 3K shows a waveform of a signal to be applied to a high-frequency transformer, and FIG. 3L shows a waveform of a signal to be outputted from a diode bridge, where FIGS. 3A, 3B, 3C . . . , 3L illustrate the generation of pulse train signals and the generation of pulse train signals resulting from exclusive-OR operations between the pulse train signals and a rectangular-wave signal;

FIGS. 6A, 6B, 6C, and 6D are views for explaining the waveform of each part of the third embodiment;

DETAILED DESCRIPTION OF THE PREFERRED EMBODIMENTS

First Embodiment

Figure 1:
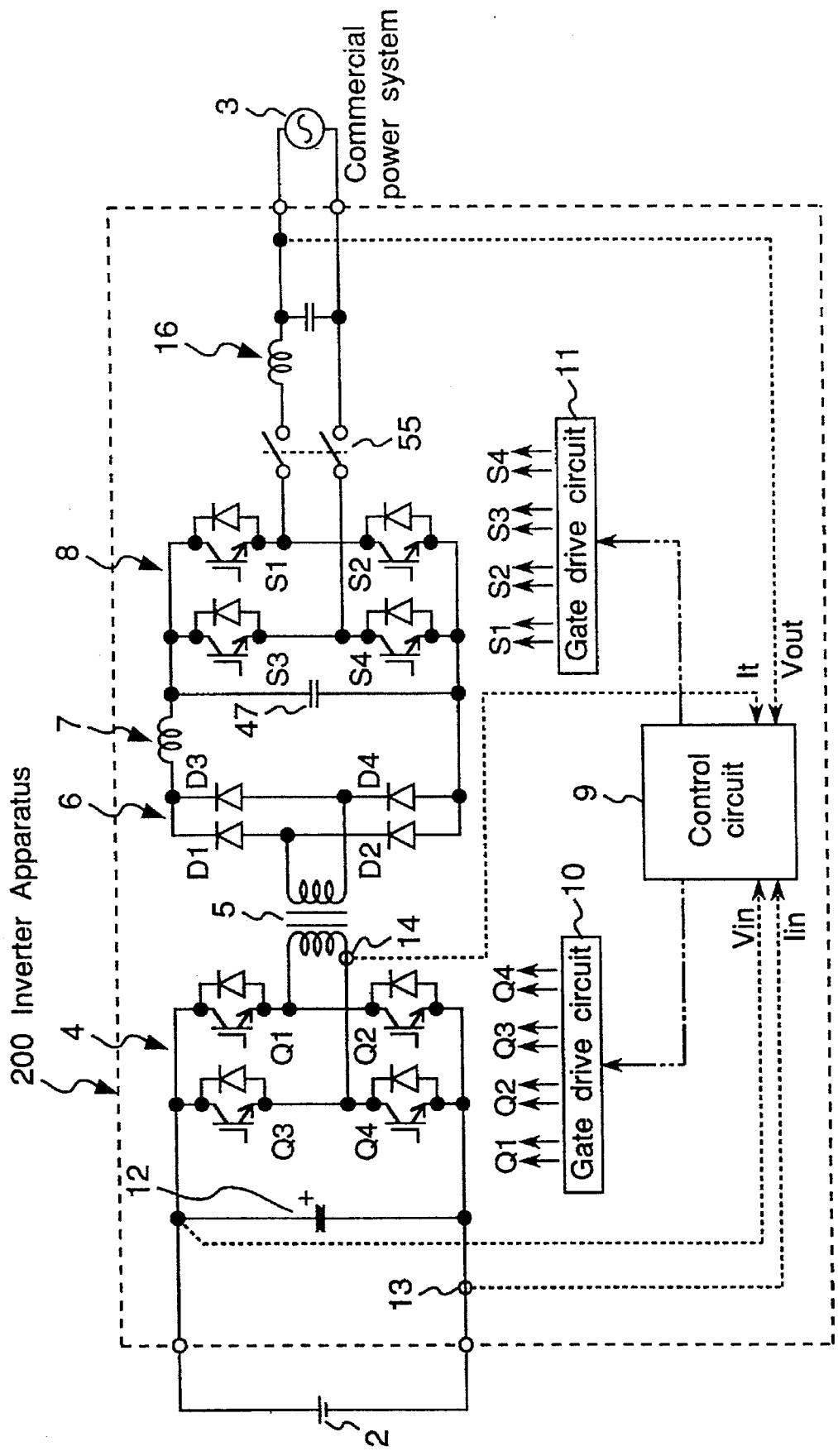
FIG. 1 is a block diagram of the inverter apparatus according to a first embodiment of the present invention.

An embodiment of the inverter apparatus of the present invention is described below in detail with reference to FIG. 1. FIG. 1 is a view showing a utility interactive photovoltaic system including the inverter apparatus of the present invention.

DC power generated from a solar cell 2 (with a 3.5 kW output and a 270 V open voltage) is converted by an inverter apparatus 200 into AC power of the same phase and the same frequency 50/60 Hz as a commercial power system 3, and supplied to the commercial power system 3.

The DC power fed to the inverter apparatus 200 from the solar cell 2 is converted into a high-frequency alternating current by a high-frequency inverter bridge 4, and supplied to the primary side of a high-frequency transformer 5. Whereas a 16 to 19 kHz high-frequency transformer is employed in the present embodiment, a case where a 19 kHz high-frequency transformer is used is described here for convenience. The high-frequency transformer 5 has a function of insulating the solar cell 2 side (primary side) and the commercial power system 3 side (secondary side) from each other. The insulated high-frequency alternating current is rectified by a diode bridge 6 composed of diodes D1, D2, D3, and D4 and provided on the secondary side of the high-frequency transformer 5. Then, the rectified current is subjected to a process of removing high-frequency components contained in the rectified waveform and a smoothing process by a filter circuit composed of a DC reactor 7 and a capacitor 47, resulting in a direct current of full-wave rectified waveform. A low-frequency inverter bridge 8 performs fold-back control on the direct current of full-wave rectified waveform at low frequency (50/60 Hz), whereby a sine-wave alternating current of low frequency is obtained. Switching devices Q1, Q2, Q3, Q4 and S1, S2, S3, S4 that constitute the high-frequency inverter bridge 4 and the low-frequency inverter bridge 8, respectively, are controlled for their turn-on and -off by a control circuit 9 and gate drive circuits 10, 11. Also, a DC capacitor 12 for suppressing variations in the input power to the inverter apparatus 200, and a DC input current detector 13 are provided at the preceding stage of the high-frequency inverter bridge 4. An inverter output current detector 14 is connected to the primary side of the high-frequency transformer 5. An interconnection relay 55 for switching the interconnection and disconnection with the commercial power system 3, and an AC filter 16 are provided at the succeeding stage of the low-frequency inverter bridge 8. In addition, the inverter output current detector 14, which is connected to the primary side of the high-frequency transformer 5 in FIG. 1, may instead be connected to the secondary side.

Figure 2:
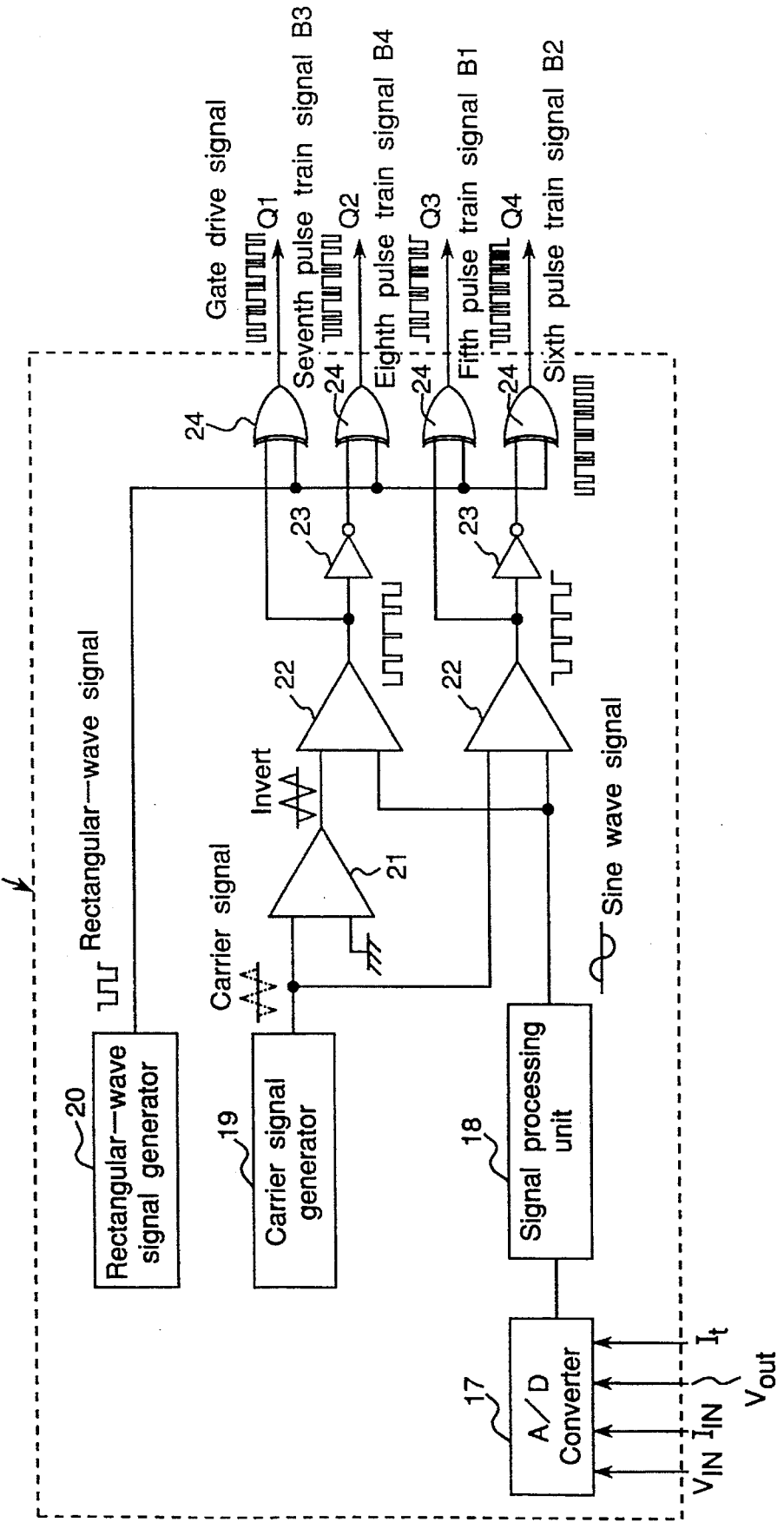
FIG. 2 is a block diagram of a control circuit of the first embodiment.

The control circuit 9, as shown in FIG. 2, comprises an A/D converter 17, a signal processing unit 18 for generating a sine-wave signal (50/60 Hz) of an output target value of the inverter apparatus 200, a carrier signal (19 kHz) generator 19 for generating a carrier signal for performing PWM control together with the sine-wave signal, a rectangular-wave signal generator 20 for generating a rectangular-wave signal which is equal in frequency to the carrier signal and which is shifted in phase by a ¼ period, an inversion circuit 21, a comparison circuit 22 for comparing the sine-wave signal and the carrier signal with each other, a NOT circuit 23, and an XOR (exclusive-OR) circuit 24. The control circuit 9 outputs pulse train signals for turning on and off the four switching devices Q1 to Q4 of the high-frequency inverter bridge 4 to the gate drive circuit 10 of FIG. 1.

With the above arrangement, the high-frequency inverter bridge 4 converts DC power derived from the solar cell 2 into a high-frequency alternating current (19 kHz) and the high-frequency transformer 5 insulates input and output from each other. The ON-OFF control in the high-frequency inverter bridge 4 is carried out in the following way by the control circuit 9 of FIG. 2. First prepared, as shown in FIGS. 3B, 3C, 3D, and 3E, are a first pulse train signal A1 obtained by comparing the sine-wave signal (50/60 Hz), which is an output target value of the inverter apparatus 200 and which is generated by the signal processing unit 18, with the carrier signal (19 kHz), a second pulse train signal A2 obtained by inverting the first pulse train signal A1, a third pulse train signal A3 derived by comparing an inverted carrier signal obtained by inverting the foregoing carrier signal, with the sine-wave signal, and a fourth pulse train signal A4 obtained by inverting the third pulse train signal. Next obtained are a rectangular-wave signal as shown in FIG. 3F which is equal in frequency to the carrier signal and shifted in phase by a ¼ period and which is generated by the rectangular-wave signal generator 20, and fifth to eighth pulse train signals B1, B2, B3 and B4 as shown in FIGS. 3G, 3H, 3I, and 3J by processing the first to fourth pulse train signals A1, A2, A3, and A4 for exclusive-OR operation by the XOR circuits 24. Then, these fifth to eighth pulse train signals are outputted to the gate drive circuit 10 as shown in FIG. 1 to perform the ON-OFF control on the switching devices Q1, Q2, Q3, and Q4 constituting the high-frequency inverter bridge 4. Although the carrier signal and the following signals in FIGS. 3A, 3B . . . , 3L should be shown by high frequencies of several tens to several hundreds kHz in contrast to the sine-wave signal, those are schematically simplified. As a result of this ON-OFF control, the high-frequency transformer 5 is excited at a high frequency (19 kHz) Ei which is equal to the frequency of the carrier signal and which has a pulse-width modulated pulse train inverted alternately of the positive and negative polarity.

The output timing of the pulse train signals to the gate drive circuit 10 in the above process is provided by synchronization with the voltage signal $V_{out}$ of the commercial power system 3. As a result, the inverter output current is controlled into the same phase as the utility line voltage.

As described above, since the output waveform of the high-frequency transformer S is a high-frequency AC waveform having a pulse-width modulated pulse train inverted alternately of the positive and negative polarity, the diode bridge 6 provided at the succeeding stage of the high-frequency transformer 5 rectifies the pulse train signal inverted alternately of the positive and negative polarity, obtaining a pulse-width modulated pulse train waveform continuous on the positive side as shown by E0 of FIG. 3L. Then, a filter circuit composed of the DC reactor 7 and the capacitor 47 provided at the succeeding stage of the diode bridge 6 as shown in FIG. 1 performs a high-frequency component removing process and a smoothing process, whereby a DC waveform equivalent to a waveform which is obtained by full-wave rectifying the sine-wave AC waveform having the same frequency as the sine-wave signal is obtained. Further, the succeeding-stage low-frequency inverter bridge 8 performs the fold-back control of alternately inverting the full-wave rectified sine-wave AC waveform from positive to negative, whereby a sine-wave AC waveform is obtained.

Second Embodiment

Figure 4:
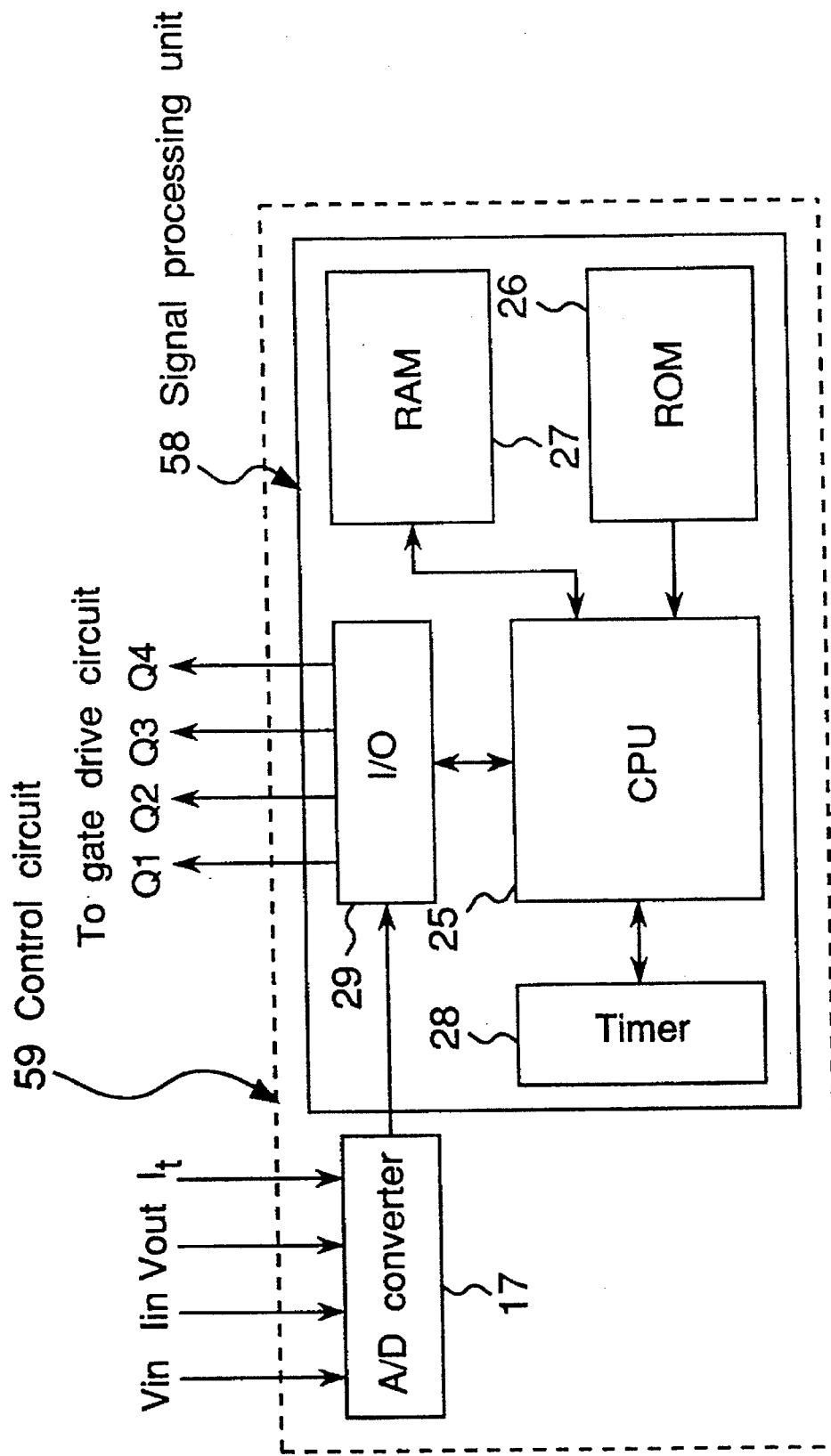
FIG. 4 is a block diagram of a control circuit of a second embodiment of the present invention.

In an embodiment as shown in FIG. 4, a control circuit 59 does not use the carrier signal generator 19, the rectangular-wave signal generator 20, the inversion circuit 21, the comparison circuit 22, the NOT circuit 23, or the XOR circuit 24 as shown in FIG. 2, but uses a signal processing unit 58 serving for all the processes that would be done by the above means. That is, the control circuit 9 as shown in FIG. 4 is composed of an A/D converter 17 and the signal processing unit 58.

As for the processes performed in the signal processing unit 58, since the unit is made up from digital circuits for PWM operation, the processes are not carried out sequentially but in batch processing with inputs of necessary signals to the signal processing unit 58. As a result, obtained are the fifth to eighth pulse train signals B1, B2, B3, and B4 as shown in FIG. 3 for turning on and off the four switching devices of the high-frequency inverter bridge 4 of FIG. 1. In this embodiment, the signal processing unit 58 is composed of a CPU 25, a ROM 26, a RAM 27, a timer 28, and an I/O interface 29 as shown in FIG. 4. Based on this arrangement, the operation within the signal processing unit 58 is described with reference to FIG. 3. In addition, the carrier signal of FIG. 3, which should actually be shown by high frequency, is simplified here schematically.

The signal processing unit 58 operates to generate a first pulse train signal A1, which becomes a High level if the sine-wave signal is greater than the carrier signal and which becomes a Low level if it is less as a result of a comparison between the sine-wave signal (50/60 Hz) and the carrier signal (19 kHz) (two-dots chain line), a second pulse train signal A2 obtained by inverting the first pulse train signal A1, a third pulse train A3, which becomes a High level if an inverted carrier signal is higher than the sine-wave signal and which becomes a Low level if it is lower as a result of a comparison between the inverted carrier signal (19 kHz) (solid line) obtained by inverting the carrier signal and the sine-wave signal, and a fourth pulse train signal A4 obtained by inverting the third pulse train signal A3. In addition, it is also possible that the "Low" level and the "High" level may be replaced with each other in the above arrangement.

With respect to the method of arithmetic operation, the method of producing the first pulse train signal A1 is described. First, intersecting points between the sine-wave signal and the carrier signal (two-dots chain line) are determined. Values between the individual intersecting points correspond to pulse widths, which are the ON time or OFF time of a pulse train signal. Next, pulse widths are calculated with respect to one period of the sine-wave signal (it also may be calculated with respect to half a period). Within the CPU 25 of FIG. 4, the pulse widths are replaced with timer counts of the timer 28. Then, a sequence of a timer count train equivalent to the pulse widths calculated with respect to one period of the sine-wave signal is temporarily stored in the RAM 27. When a synchronization signal generated from the voltage signal $V_{out}$ of the commercial power system 3 is inputted to the CPU 25 via the I/O interface 29, the temporarily stored timer count train is read from the RAM 27 one by one and set to the timer 28. When a timer interrupt has taken place, the timer is decremented by an extent of the timer count set to the timer 28. At the same time, bit 1 corresponding to the "High" level of the pulse signal or bit 0 corresponding to the "Low" level is outputted to the I/O interface 29. By such an operation, until the counter reaches the count 0, i.e., until an extent of decrement that corresponds to an event of the next interrupt is reached, the "High" level or the "Low" level is maintained. The "High" or "Low" level is outputted to the gate drive circuit 10 of FIG. 1 via the I/O interface 29, whereby a pulse signal having one pulse width is generated.

The above operation is executed in the CPU 25 by reading operational instructions within the ROM 26. When these operations are done for all the timer counts temporarily stored in the RAM 27, then the first pulse train signal A1 with respect to one period of the sine-wave signal is generated and outputted to the gate drive circuit 10 of FIG. 1. The second to fourth pulse train signals A2, A3, and A4 are also generated and outputted in the same way. The gate drive circuit 10 performs the ON-OFF control on the four switching devices Q1, Q2, Q3, and Q4 constituting the high-frequency inverter bridge However, the high-frequency transfer 5 is not exited at the same high frequency (several tens to hundreds kHz) as that of the carrier signal with the pulse train signals A1, A2, A3 and A4. Therefore, in actual, exclusive-OR is performed on the rectangular-wave signal which is equal in frequency to the carrier signal prepared previously in the RAM 27 and shown in FIG. 3F, and which is shifted in phase by a ¼ period, and the pulse train signals A1, A2, A3 and A4 respectively. The fifth to eighth pulse train signals B1, B2, B3 and B4 are obtained as shown in FIGS. 3G, 3H, 3I and 3J. The new fifth to eighth pulse train signals B1, B2, B3 and B4 are outputted to the gate drive circuit 10. ON-OFF control is performed on the four switching devices Q1, Q2, Q3 and Q4 which constitute the high-frequency inverter bridge 4. As a result, the high-frequency transformer is excited with a high frequency Ei having the same high frequency (several tens to several hundreds kHz) as the carrier signal and having a pulse-width modulated pulse train inverted alternately of the positive and negative polarity. The control circuit 59, if formed from digital circuits in this way, can be simplified in construction.

Third Embodiment

Figure 5:
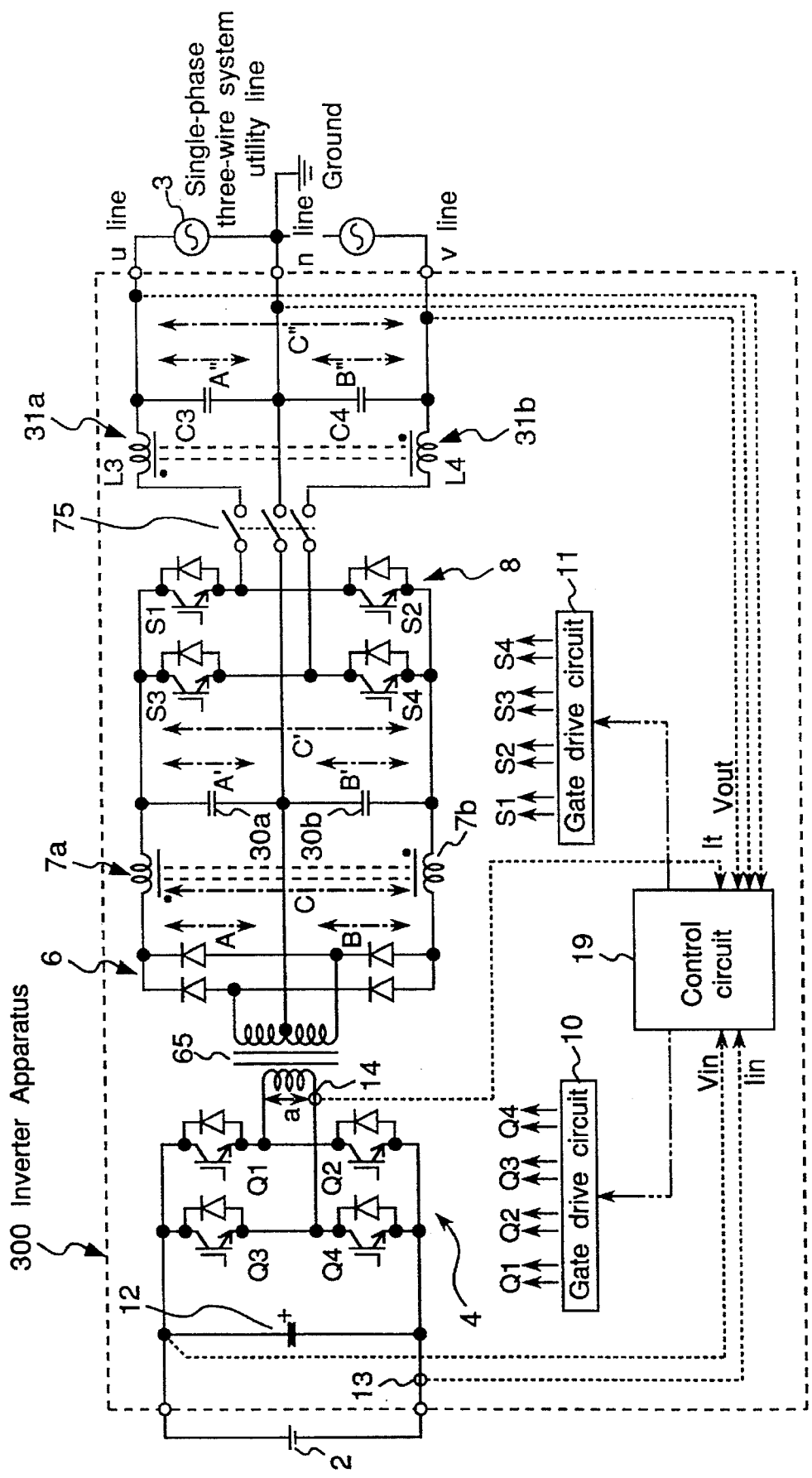
FIG. 5 is a block diagram of an inverter apparatus according to a third embodiment of the present invention.

An inverter apparatus which is a third embodiment of the present invention is described with reference to FIG. 5. An inverter apparatus 300 of the present invention is inserted between a solar cell 2 and an existing commercial power system 3. DC power generated by the solar cell 2 is converted into AC power of 50/60 Hz, and supplied to loads in interconnection with the commercial power system 3 while an inverse power flow to the commercial power system 3 is also performed. The respective lines of the single-phase three-wire system distribution line of the commercial power system 3 are hereinafter designated as n line, which is the neutral line, u line, and v line as shown in FIG. 5, respectively.

Referring to the arrangement of the inverter apparatus 300 of the embodiment, an input capacitor 12 is provided for suppressing the input voltage of the inverter apparatus 300 from any rapid change due to variation in the output of the solar cell caused by sunlight variation. The DC power inputted to the inverter apparatus 300 is led to the high-frequency inverter bridge 4 composed of switching devices Q1 to Q4, and converted from DC into AC current. Further, the output of the high-frequency inverter bridge 4 is supplied to the primary side of a high-frequency transformer 65, where it is electrically insulated. A center tap is provided on the secondary side of the high-frequency transformer 65 and the line from the center tap is connected to the neutral line, n line, of the single-phase three-wire system distribution line of the commercial power system via an interconnection relay 75. Also, the other two lines on the secondary side of the high-frequency transformer 65 are inputted to AC input terminals of the diode bridge 6 and converted from AC into DC current. DC reactors 7a and 7b are connected to the two lines derived from DC output terminals of the diode bridge 6 up-and-down symmetrically, and further capacitors 30a and 30b inserted between the two lines and the neutral line n are connected. Thereafter, the DC current is inputted to the low-frequency inverter bridge 8 composed of switching devices S1 to S4, where the input is converted again from DC to AC current. The two output lines of the low-frequency inverter bridge 8 are connected to two lines other than the neutral line, n line, of the single-phase three-wire system distribution line of the commercial power system 3, i.e., u line and v line, via filter circuits 31a and 31b arranged up-and-down symmetrically between the interconnection relay 75 and the neutral line n. The filter circuits 31a and 31b have reactors $L_3$ and $L_4$, capacitors $C_3$ and $C_4$, respectively.

Next the action of the inverter apparatus of the present embodiment is described. First, in the high-frequency inverter bridge 4, gate drive signals for IGBT (Insulated Gate Bipolar Transistor) devices Q1 to Q4, which are four switching devices constituting the high-frequency inverter bridge 4, are generated by a comparison between the sine-wave signal (50/60 Hz) and the high-frequency carrier signal (19 kHz), whereby the primary side of the high-frequency transformer 65 is excited by a pulse train signal that has been subjected to a sine-wave pulse-width modulation. In this process, the excitation of the primary side of the high-frequency transformer 65 with high-frequency alternating current (19 kHz) is performed by a pulse train as shown by "a" of FIG. 6A, which results from inverting the pulse-width modulated pulse train signal alternately of the positive and negative polarity. Although the pulse train is illustrated schematically for a better understanding, it has the same frequency as the high-frequency carrier signal. As the control method for exciting the high-frequency transformer 65 with high-frequency alternating current, as described above, the gate drive signals for the IGBT devices Q1 to Q4 constituting the high-frequency inverter bridge 4 are generated in the same way as in the first or second embodiment. That is, the control circuit 9 of FIG. 5 has the same structure as the control circuit 9 of FIG. 2, and acts as shown in FIG. 3.

In the manner as described above, the high-frequency alternating current (19 kHz) is supplied to the primary side of the high-frequency transformer 65, and a high-frequency alternating current transformed to a voltage corresponding to the turn ratio of the transformer is outputted to the secondary side of the high-frequency transformer 65. In this case, the high-frequency transformer 65 has both a function of electrically insulating the commercial power system 3 and the solar cell 2 from each other and another function of transforming the output voltage relative to the input voltage at a ratio of transformation corresponding to the turn ratio. Further, between the center tap and the two output lines of the transformer, the center tap provided on the secondary side of the high-frequency transformer 65 causes three line voltages to be generated: one between the center tap and the upper line of the transformer output, another between the center tap and the lower line of the transformer output, and the other between the upper line of the transformer output and the lower line of the transformer output. The waveform of these three line voltages on the secondary side of the high-frequency transformer 65 is also a high-frequency alternating current having a pulse-width modulated pulse train inverted alternately of the positive and negative polarity, similar to that of the primary side as shown in FIG. 6A.

The above three line voltages are rectified by the succeeding-stage diode bridge 6, resulting in a first line voltage A, a second line voltage B, and a third line voltage C, which are DC voltages of pulse-width modulated pulse trains continuous on the positive side as shown in FIGS. 6A, 6B, and 6C, respectively. Further, via the filter circuit composed of the DC reactors 7a, 7b provided in series on two output lines of the diode bridge 6 and the capacitors 30a, 30b provided up-and-down symmetrically between the two output lines and the output line derived from the center tap of the high-frequency transformer 65, the first line voltage A, the second line voltage B, and the third line voltage C have their high-frequency ripple components removed from the DC voltage waveforms A, B, and C so as to be smoothed as shown by "A'", "B'", and "C'" of FIGS. 7A, 7B, and 7C, thus resulting in DC voltage waveforms similar to a waveform resulting from full-wave rectifying a low-frequency sine wave.

Figure 7D:
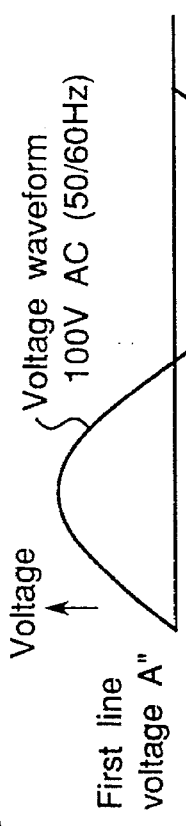
FIGS. 7A, 7B, 7C, 7D, 7E, and 7F are views for explaining the waveform of each part of the third embodiment.
Figure 7E:
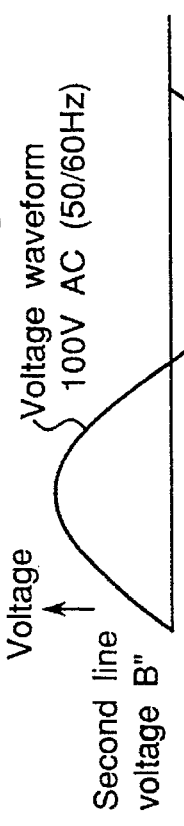
Figure 7F:
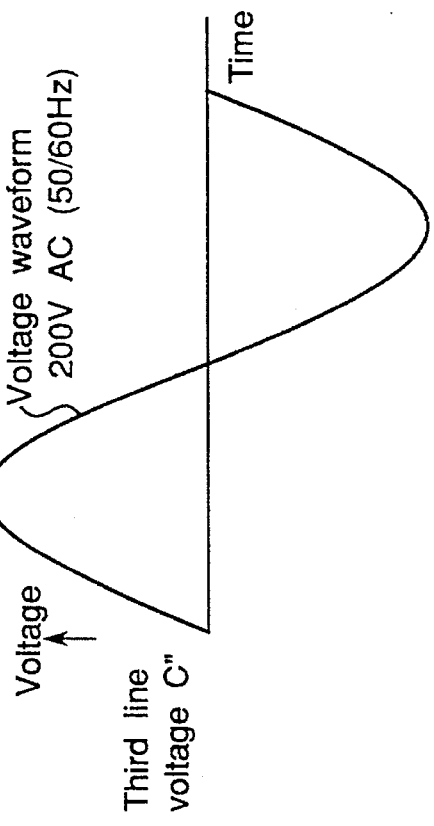
Figure 7A:
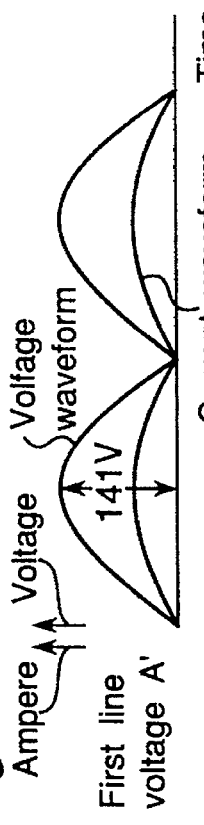
Figure 7B:
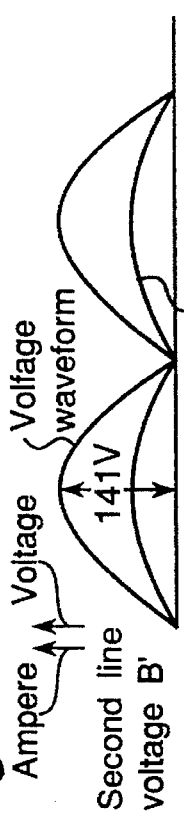
Figure 7C:
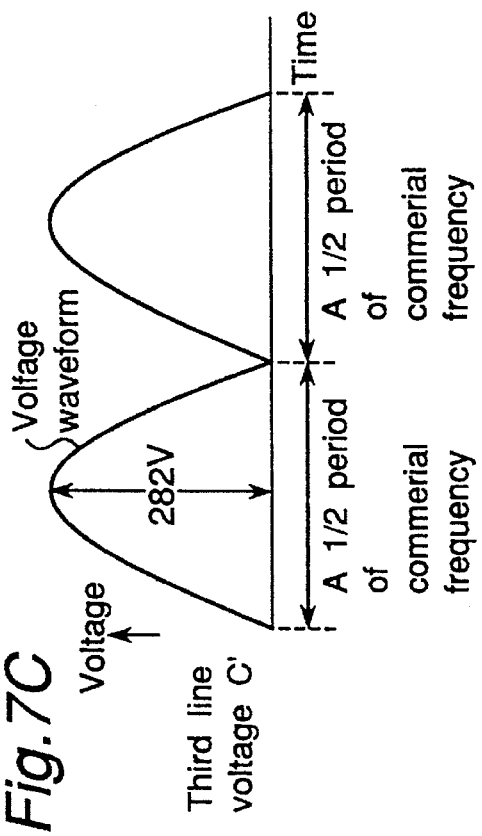

Between the first line voltage A' and the second line voltage B' of the filter circuit output as shown in FIGS. 7A and 7B, and the third line voltage C' as shown in FIG. 7C, which is the line voltage between two lines other than the line connected to the center tap of the high-frequency transformer 65, there is a relationship that first line voltage A'+second line voltage B'=third line voltage C'. If the center tap of the transformer 65 is assumed to be the midpoint of the secondary side winding, then the first line voltage equals the second line voltage so that the third line voltage has a voltage value two times larger than that of the first or second line voltage. Also, in the present embodiment, the waveform of the current flowing through the two output lines of the filter circuit other than one line connected to the center tap is the same waveform in phase as the voltage waveform as shown in FIGS. 7A and 7B.

Further, the two lines constituting the three line voltages (other than the one line connected to the center tap) are inputted to the succeeding-stage low-frequency inverter bridge 8. Gate terminals of the four IGBT devices (S1 to S4) constituting the low-frequency inverter bridge 8 are turned on and off alternately between S1, S4 and S2, S3 with commercial frequency i.e. power frequency. That is, in synchronization with the valleys of the voltage values (0 V points) of the individual line voltages as shown in FIGS. 7A and 7B, the switching devices S2 and S3 are turned on while S1 and S4 are off, and so on. As a result, the waveforms of voltage and current shown in FIGS. 7A and 7B have the mountains of full-wave rectified sine waves inverted alternately and up-and-down symmetrically, so that the voltage waveforms as shown in FIGS. 7A and 7B are converted into sine-wave AC waveforms of commercial frequency. Further, the waveforms are smoothed by the filter circuits 31a, 31b arranged up-and-down symmetrically between the neutral line and the two output lines of the low-frequency inverter bridge 8 via the interconnection relay 75, so that voltage waveforms and current waveforms of commercial frequency shaped by removal of the harmonic-component as shown in FIGS. 7D and 7E can be obtained.

If the voltage between the output line derived from the AC filter circuit 31a and the one line connected to the center tap is a first line voltage A", the voltage between the output line derived from the AC filter circuit 31b and the one line connected to the center tap is a second line voltage B", and if the voltage between the two output lines from the AC filter circuit 31a, 31b is a third line voltage C", then the first line voltage waveform A", the second line voltage waveform B", and the third line voltage waveform C" are as shown in FIGS. 7D, 7E, and 7F, respectively.

As in the above-described case, the third line voltage C" has a voltage value two times larger than that of the first line voltage A" or the second line voltage B". By designing the turn ratio of the high-frequency transformer 65 so that the first line voltage and the second line voltage are 100 V and the third line voltage is 200 V (in the present embodiment, the turn ratio of the transformer is 1:2.2 to 2.7 and the center tap of the transformer is provided at the midpoint of the secondary winding since the rated input voltage is 200 VDC), the inverter apparatus 300 can realize the reduction in size and weight of the apparatus with the use of the high-frequency transformer 65. Moreover, the inverter apparatus 300 has the three lines of u line, n line, and v line including the neutral line as the outputs of the inverter apparatus 300 and the individual line voltages therebetween have line voltages that can be interconnected to the single-phase three-wire system distribution line of the commercial power system 3. Thus, system interconnection with the single-phase three-wire system distribution line of the commercial power system 3 becomes also possible.

Instead of providing the center tap on the secondary side, the high-frequency transformer 65 may also have two secondary side windings, where the winding start of one winding and the winding end of the other may be connected to each other to replace the aforementioned center tap.

By combining the above-described main circuit construction of the inverter apparatus 300 that the high-frequency transformer 65 is provided with a center tap and the center tap is connected to the neutral line of the commercial power system 3, with the inverter control method that the high-frequency transformer 65 is excited with a high-frequency alternating current having a pulse-width modulated pulse train inverted alternately of the positive and negative polarity, it becomes possible to use a high-frequency transformer which is about 1/30 in capacity ratio and about 1/20 in weight ratio, instead of the power-frequency transformer. Thus, the inverter apparatus can be reduced in size and weight as compared with the method using a power-frequency transformer.

Further, it becomes possible to obtain a sine-wave AC waveform reduced in distortion similar to the waveform output by the conventional PWM control with quite a simple construction in which, for example, only gate processing of exclusive OR operation is added to the conventional PWM control.

It is also possible to realize an inverter apparatus of the high-frequency insulation type capable of interconnection with the single-phase three-wire system distribution line of the commercial power system by the same electrical method.

Fourth Embodiment

Figure 8:
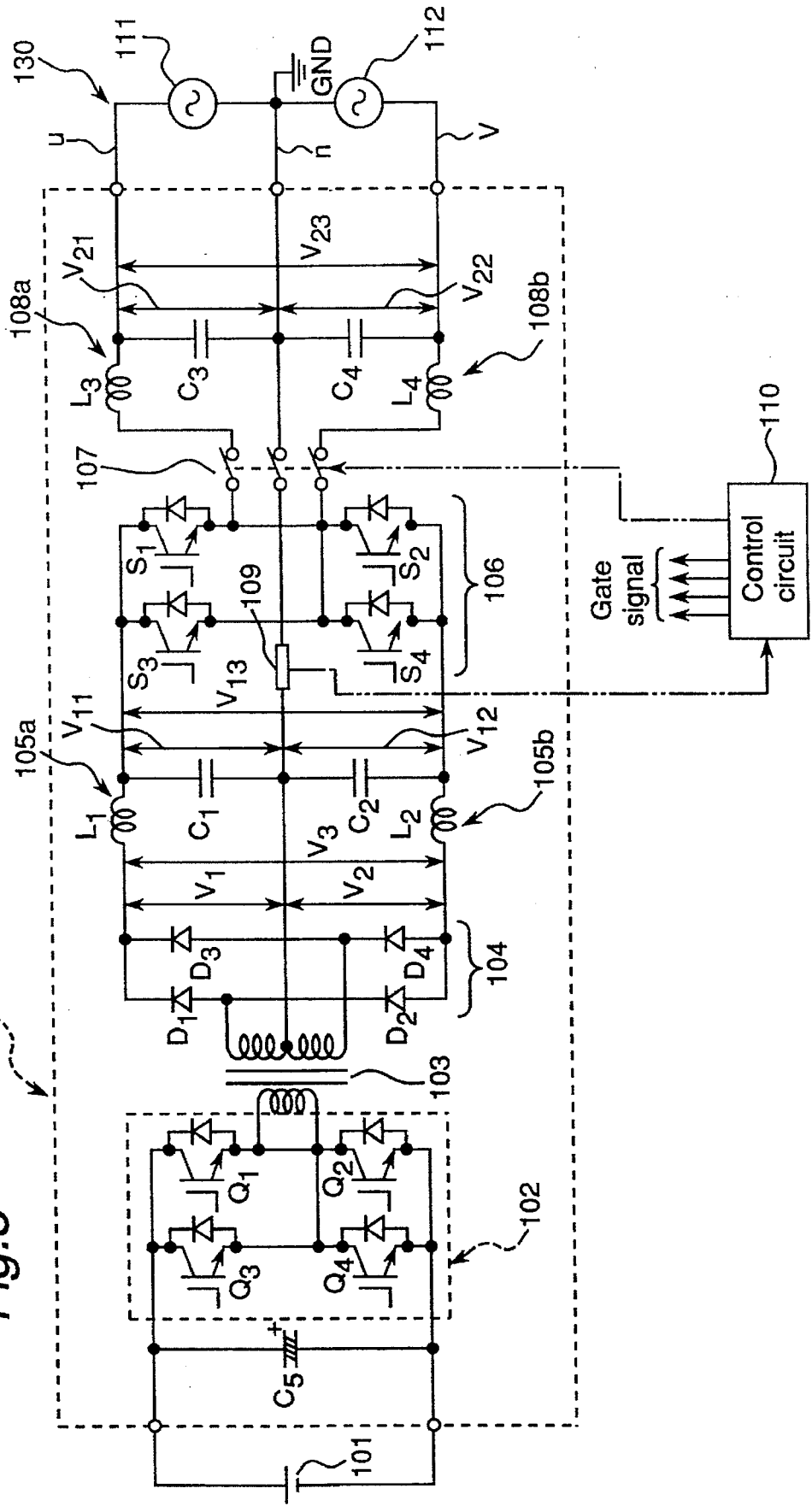
FIG. 8 is a main-part arrangement view of an inverter apparatus according to a fourth embodiment of the present invention.
Figure 9A:
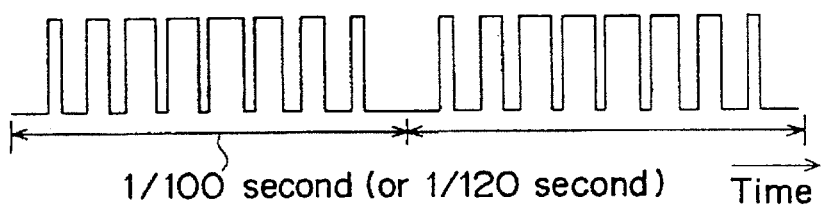
FIGS. 9A, 9B, and 9C are views showing voltage waveforms of line voltages of the output of the diode bridge of the above inverter apparatus.
Figure 9B:
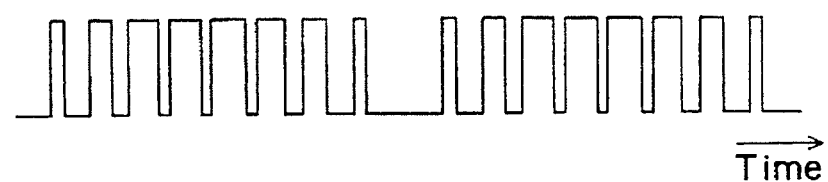
Figure 9C:
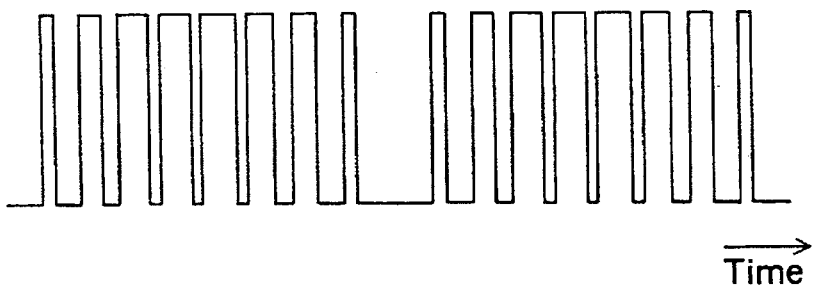

FIG. 8 shows the main-part arrangement of an inverter apparatus 400 of a fourth embodiment. Reference numeral 101 denotes a solar cell; 102 denotes a high-frequency inverter bridge serving as a first power conversion unit whose input terminal is connected to the DC voltage output terminal of the solar cell 101 and which is composed of switching devices Q1 to Q4; 103 denotes a high-frequency transformer whose primary side input terminals are connected to the output terminals of the high-frequency inverter bridge 102 and which has a center tap at generally the center of the secondary winding; 104 denotes a diode bridge serving as a second power conversion unit whose input terminals are connected to the secondary side output terminals of the high-frequency transformer 103 and which is composed of diodes D1, D2, D3, and D4; 105a denotes a filter circuit which is composed of a reactor $L_1$ whose one end is connected to one of the DC output terminals of the diode bridge 104 and a capacitor $C_1$ connected between the other end of the reactor $L_1$ and the center tap of the high-frequency transformer 103; 105b denotes a filter circuit which is composed of a reactor $L_2$ whose one end is connected to the other of the DC output terminals of the diode bridge 104 and a capacitor $C_2$ connected between the other end of the reactor $L_2$ and the center tap of the high-frequency transformer 103; and 106 denotes a commercial-frequency inverter bridge serving as a third power conversion unit whose input terminals are connected to the DC voltage output terminals of the filters 105a, 105b and which is composed of switching devices $S_1$ to $S_4$. Reference numeral 107 denotes an interconnection relay for three circuits, where the output terminals of the commercial-frequency inverter bridge 106 and the center tap of the high-frequency transformer 103 are connected to their corresponding input terminals of the relay; 108a denotes a filter circuit composed of a reactor $L_3$ to one end of which one of the output terminals of the commercial-frequency inverter bridge 106 is connected via an interconnection relay 107 and a capacitor $C_3$ which is connected between the other end of the reactor $L_3$ and the center tap of the high-frequency transformer 103 via an interconnection relay 107; and 108b denotes a filter circuit composed of a reactor $L_4$ whose one end is connected to the other of the output terminals of the commercial-frequency inverter bridge 106 via an interconnection relay 107 and a capacitor $C_4$ which is connected between the other end of the reactor $L_4$ and the center tap of the high-frequency transformer 103 via an interconnection relay 107. Further, a current detector 109 is provided between the connection point of the capacitors $C_1$, $C_2$ of the filter circuits 105a, 105b and the interconnection relays 107.

Also provided is a control circuit 110 as a first control unit for outputting gate signals to the gate terminals of the switching devices $S_1$ to $S_4$ of the commercial-frequency inverter bridge 106 upon receiving a signal representing overcurrent derived from the current detector 109, and for outputting an open/close signal to the interconnection relays 107. Further, the control circuit 110 is similar to the control circuit 9 of FIG. 2 and functions as shown in FIG. 3. In addition, an input capacitor $C_5$ is connected between the input terminals of the high-frequency inverter bridge 102, so that the high-frequency inverter bridge 102 is suppressed by the input capacitor $C_5$ from rapid change in the DC voltage input against variation in the DC voltage output of the solar cell 101 due to variation in the quantity of sunlight.

One end of a commercial power supply 111 is connected to the other end of the reactor $L_3$ of the filter circuit 108a via a voltage line u of the single-phase three-wire system distribution line of a commercial power system 130. One end of a commercial power supply 112 is connected to the other end of the commercial power supply 111. Meanwhile, the other end of the commercial power supply 112 is connected to the other end of the reactor $L_4$ of filter circuit 108b via the voltage line v of the single-phase three-wire system distribution line of the commercial power system 130. A neutral point between the commercial power supplies 111, 112 of the single-phase three-wire system distribution line is connected to ground GND. Also, the neutral point of the commercial power supplies 111, 112 is connected to the connection point between the capacitors $C_3$, $C_4$ of the filter circuits 108a, 108b via the neutral line n of the single-phase three-wire system distribution line, and the neutral line n is connected to the center tap of the high-frequency transformer 103 via the interconnection relay 107 and the current detector 109.

In the inverter apparatus 400 with the above arrangement, the control circuit 110 outputs gate signals pulse-width modulated by using a high-frequency carrier (20 kHz) similarly to FIG. 3. Receiving the gate signals at the gate terminals of the switching devices $S_1$ to $S_4$ of the high-frequency inverter bridge 102, the high-frequency inverter bridge 102 converts DC power fed from the solar cell 101 into AC power. That is, the control circuit 110 generates a sine-wave signal of the same phase and the same frequency (50/60 Hz) as the voltage waveform of the commercial power system 130 by an unshown sine-wave generation circuit, and outputs gate signals pulse-width modulated based on the sine wave and the high-frequency carrier, thereby controlling the inverter output current. Then, the high-frequency transformer 103 transforms the AC voltage derived from the output terminals of the high-frequency inverter bridge 102 at a ratio of transformation according to a specified turn ratio. By this high-frequency transformer 103, the DC side of the solar cell 101 and the AC side of the commercial power system 130 are electrically insulated from each other. Further, by providing a center tap to the secondary side winding of the high-frequency transformer 103, there can be obtained three pulse-width modulated high-frequency AC voltages between the center tap and two output terminals of the high-frequency transformer 103, and between the two output terminals of the high-frequency transformer 103.

The pulse-width modulated high-frequency AC voltages from the high-frequency transformer 103 are rectified by the succeeding-stage diode bridge 104, resulting in a first line voltage $V_1$, a second line voltage $V_2$, and a third line voltage $V_3$, which are all DC voltages on which a high-frequency ripple voltage has been superimposed, as shown in FIGS.

Figure 10A:
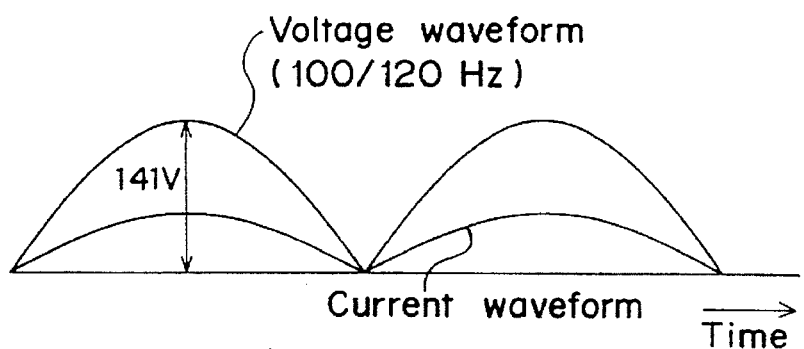
FIGS. 10A, 10B, and 10C are views showing voltage waveform and current waveform of line voltages of the output of a filter circuit of the above inverter apparatus.
Figure 10B:
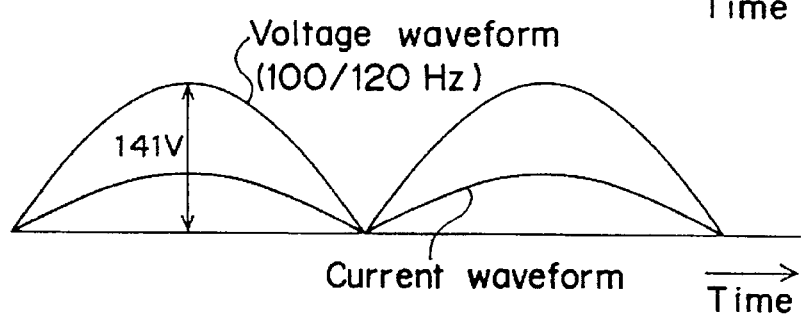
Figure 10C:
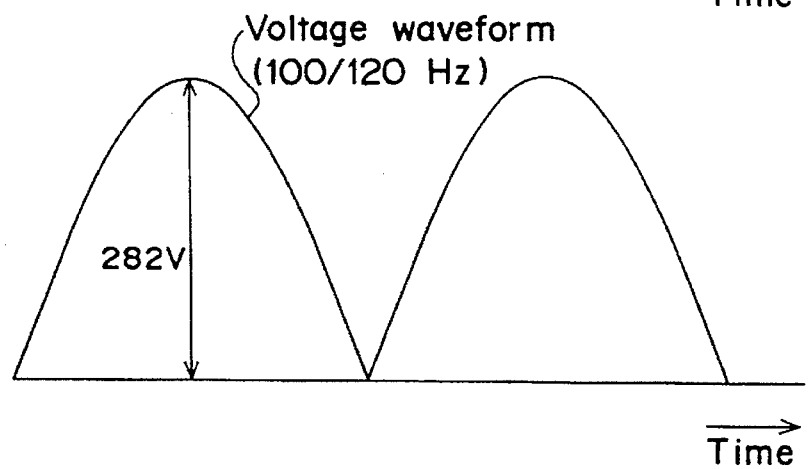

9A, 9B, and 9C. Further, by the filter circuits 105a, 105b which are composed of the reactor $L_1$ and capacitor $C_1$, and the reactor $L_2$ and capacitor $C_2$, respectively, a first line voltage $V_{11}$, a second line voltage $V_{12}$, and a third line voltage $V_{13}$ have their high-frequency ripple components smoothed from the DC voltage waveforms as shown in FIGS. 10A, 10B, and 10C, resulting in DC voltage waveforms resulting from full-wave rectifying the sine wave of the commercial frequency. In this case, the peak voltage of the first line voltage $V_{11}$ and the second line voltage $V_{12}$ is 141 VDC, and that of the third line voltage $V_{13}$ is 282 VDC.

Among the first line voltage $V_{11}$, the second line voltage $V_{12}$, and the third line voltage $V_{13}$ of the output of the filter circuits 105a, 105b, there is a relationship that $$V_{13}=V_{11}+V_{12}.$$

That is, since the center tap of the high-frequency transformer 103 is provided at generally the midpoint of the secondary side winding, the first line voltage $V_{11}$ and the second line voltage $V_{12}$ become generally equal to each other, while the third line voltage $V_{13}$ becomes a voltage value approximately two times larger than that of the first line voltage $V_{11}$ or the second line voltage $V_{12}$. Also, since the inverter output current is pulse-width modulated by a sine-wave signal of the same phase and the same frequency as the voltage waveform of the commercial power system 103, the waveforms of the currents flowing through the output terminals of the filter circuits 105a, 105b is a waveform equal in phase with the voltage waveforms, as shown in FIGS. 10A and 10B.

Figure 11A:
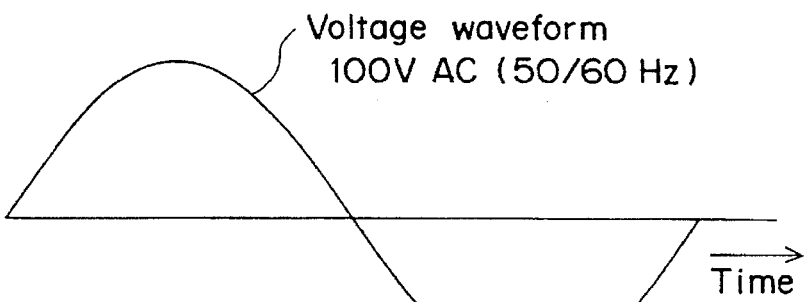
FIGS. 11A, 11B, and 11C are views showing voltage waveform of line voltages of the output of a commercial-frequency inverter bridge of the above inverter apparatus.
Figure 11B:
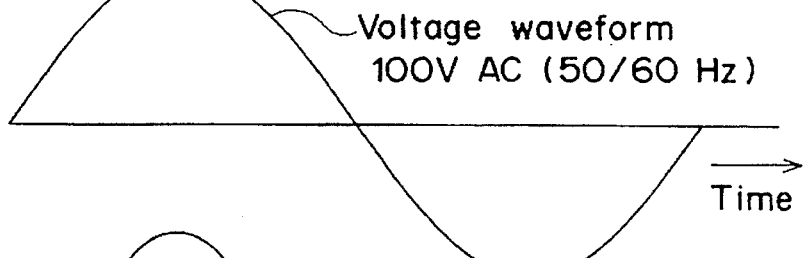
Figure 11C:
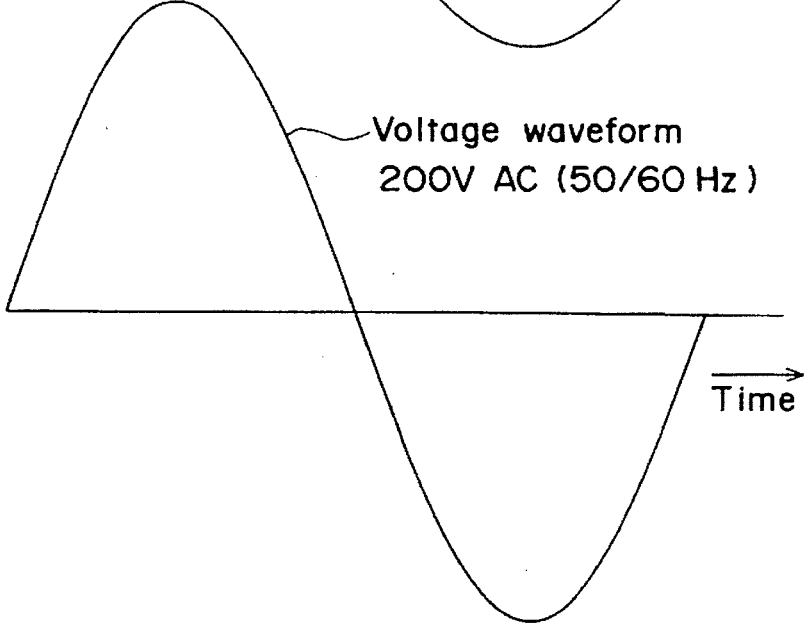

Further, the third line voltage $V_{13}$ is inputted to the input terminals of the succeeding-stage commercial-frequency inverter bridge 106. At this point, the control circuit 110 turns on and off alternately the switching devices S1, S4 and the switching devices S2, S3 by controlling the gate terminals of the switching devices S1 to S4 based on the commercial frequency, the switching devices S1 to S4 being four IGBTs constituting the commercial-frequency inverter bridge 106. That is, in synchronization with the valley bottoms (0 V points) of the voltage value of the line voltages $V_{11}, V_{12}$ as shown in FIGS. 10A, 10B, the control circuit 110 turns off the switching devices S2, S3 while the switching devices S1, S4 are on, and so forth. As a result, voltage waveform and current waveform of the line voltage $V_{11}, V_{12}$ are inverted alternately of the crests of the individual sine waves of full-wave rectified waveforms so as to be converted into sine-wave AC waveforms of commercial frequency. Further, the sine-wave AC voltage derived from the commercial-frequency inverter bridge 106 has harmonic components removed by the filter circuits 108a, 108b so that commercial-frequency AC voltage waveforms that have been shaped in waveform can be obtained as shown in FIGS. 11A, 11B, and 11C. FIG. 11A shows a first line voltage $V_{21}$ across the capacitor $C_3$ of the filter circuit 108a, FIG. 11B shows a second line voltage $V_{22}$ across the capacitor $C_3$ of the filter circuit 108b, and FIG. 11C shows a third line voltage $V_{23}$ between the two output terminals of the filter circuits 108a, 108b.

In this case, the ratio of transformation of the high-frequency transformer 103 is designed so that the third line voltage $V_{23}$ has a voltage value approximately two times larger than that of the first line voltage $V_{21}$ or the second line voltage $V_{22}$ and that the first line voltage $V_{21}$ and the second line voltage $V_{22}$ are 100 VAC and the third line voltage $V_{23}$ is 200 VAC with respect to the DC voltage of the output of the solar cell 101 (in the inverter apparatus 400 of the fourth embodiment, since the rated input voltage is 200 VDC, it is assumed that the turn ratio of the high-frequency transformer 103 is 1:2.2 to 2.7 and the center tap of the high-frequency transformer 103 is at generally the midpoint of the secondary winding).

In this case also, since the gate terminals of the switching devices S1 to S4, which are the four IGBTs constituting the commercial-frequency inverter bridge 106, are controlled in synchronization with the valley bottoms (0 V points) of the voltage value of the line voltages as shown in FIGS. 10A and 10B, the switching devices S1, S4 and the switching devices S2, S3 are turned on and off alternately, whereby the full-wave rectified sine waves are alternately inverted at their crests and converted into commercial-frequency sine-wave AC waveforms as shown in FIGS. 11A and 11B. In order to accomplish this control, the switching devices S1, S4 or the switching devices S2, S3, which are the four IGBTs of the commercial-frequency inverter bridge 106, need to be each turned on and off simultaneously. However, in stricter sense, there are some cases where even if utterly the same gate signals are given, the timing with which switching devices S1 to S4 turn on and off may shift due to variations in the characteristics of the individual IGBTs.

For example, referring to FIG. 8, in the case where the same gate signals are given from the control circuit 110 to the gate terminals of the switching devices S1, S4 so that the switching devices S1, S4 are turned on simultaneously, if the switching device S1 is turned on earlier than the switching device S4 by a slight time interval due to variation in the characteristics of the switching devices S1, S4, then a current flows through a path that leads from the upper output terminal of the high-frequency transformer 103 via the reactor $L_1$, the switching device S1, the filter circuit 108a, the voltage line u, the neutral line n, and the current detector 109, to the center tap of the high-frequency transformer 103. Thereafter, in the aforementioned slight time interval, when the switching device S4 is turned on, a current flows through a path that leads from the center tap of the high-frequency transformer 103 via the current detector 109, the neutral line n, the voltage line v, the filter circuit 108b, the switching device S4, and the reactor $L_2$, to the lower output terminal of the high-frequency transformer 103. Accordingly, when the loads connected to the single-phase three-wire system distribution line are balanced, a transient current matching the loads flows in a direction from the neutral line n of the commercial power system 130 toward the center tap of the high-frequency transformer 103 during the slight time interval from when the switching device S1 is turned on until when the switching device S4 is turned on. Then, when the switching device S4 is turned on, a current equivalent to the above current flows in a direction reverse to the above direction, so that the apparent current becomes zero.

As seen above, with balanced loads of the single-phase three-wire system distribution line of the commercial power system 130, when the switching device S1 and the switching device S4 are turned on simultaneously, the current flowing through the current detector 109 is zero. However, if the timing with which the individual switching devices are turned on is shifted, a current flows through the neutral line for a slight time interval to which the timing is shifted. That is, when the switching device S1 is turned on earlier than the switching device S4 by a slight time interval, a transient current flows for the slight time interval from the neutral line n of the commercial power system 130 toward the center tap of the high-frequency transformer 103 (negative direction). On the other hand, when the switching device S4 is turned on earlier than the switching device S1 by a slight time interval, a transient current flows for the slight time interval from the center tap toward the neutral line n (positive direction).

Figure 12A:
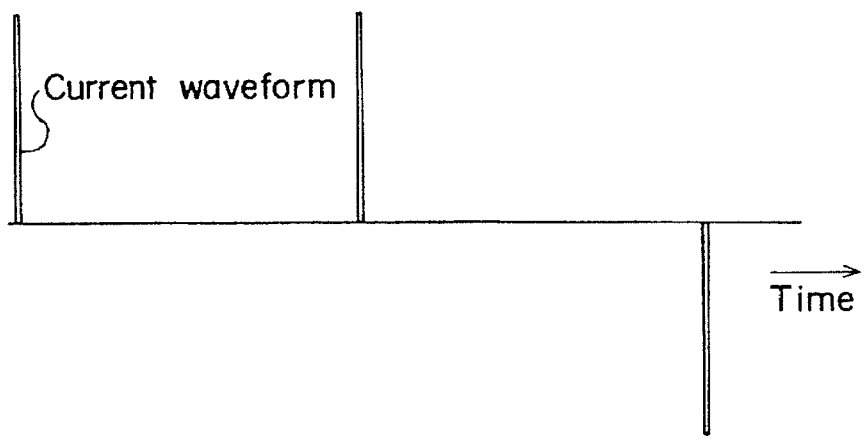
FIGS. 12A and 12B are views showing waveform of the current flowing through a neutral line when the IGBT (Insulated Gate Bipolar Transistor) devices constituting the commercial-frequency inverter bridge of the inverter apparatus are turned on or off.
Figure 12B:
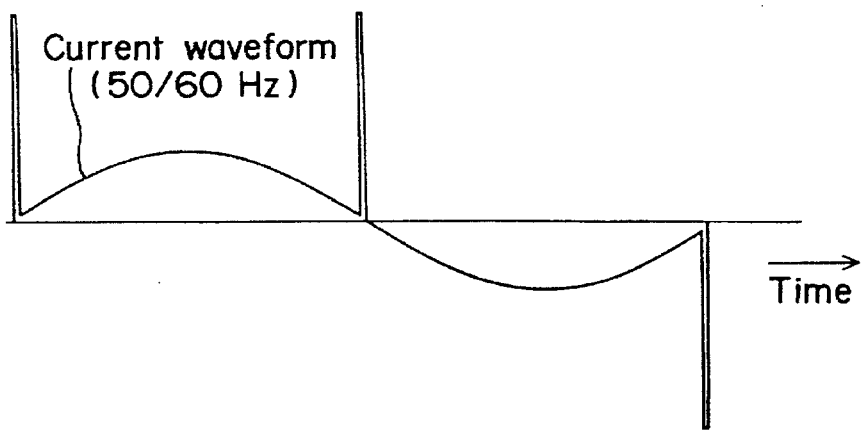

In addition, even with unbalanced loads of the single-phase three-wire system distribution line of the commercial power system 130, there will arise a phenomenon similar to the above as shown in FIG. 12B. In this case, although some current has previously been flowing through the neutral line n, a transient current flows through the current detector 109 at zero-cross points every half periods of the commercial-frequency sine wave with shifted timing with which the switching devices are turned on.

Likewise, when the switching device S1 and the switching device S4 are off, and when the switching device S2 and the switching device S3 are off, the same thing will take place. Regardless of whether the loads are balanced or unbalanced, the waveform of the current flowing through the neutral line n is such that a transient current flows at zero-cross points every half periods of the commercial-frequency sine wave either in either the positive or negative direction, as shown in FIGS. 12A and 12B.

Thus, receiving the signal representing an overcurrent derived from the current detector 109, the control circuit 110 discriminates the direction in which the transient current flows (whether it is the positive or negative direction). If it is decided that the transient current has flowed in the negative direction, the control circuit 110 controls the gate signals so as to delay by a slight time interval the turn-on of the switching device S1 and the turn-off of the switching device S3, and to expedite by a slight time interval the turn-off of the switching device S2 and the turn-on of the switching device S4. Meanwhile, if it is decided that the transient current has flowed in the positive direction, the control circuit 110 controls the gate signals so as to delay by the slight time interval the turn-off of the switching device S2 and the turn-on of the switching device S4, and to expedite by the slight time interval the turn-on of the switching device S1 and the turn-off of the switching device S3. In addition, the control circuit 110 controls the gate signals in such a way that upper and lower limits of the turn-on and -off time of the switching devices S1 to S4 will not exceed predetermined upper and lower limits. In this way, the transient current that flows through the current detector 109 inserted between the neutral line n of the single-phase three-wire system distribution line and the center tap of the high-frequency transformer 103 (the current is caused by a shift of the ON-OFF timing due to variation in the characteristics of the switching devices S1 to S4) can be offset.

As seen above, the inverter apparatus 400 is inserted between the solar cell 101 and the single-phase three-wire system distribution line of the existing commercial power system 130, and converts DC power generated by the solar cell 101 into AC power of 60/50 Hz. Thus, the inverter apparatus 400 supplies the power to loads in interconnection with the commercial power system 130 and supplies inverse power flow also to the commercial power system 130. Accordingly, the inverter apparatus 400 can be reduced in size and weight (with a capacity ratio of about ¼ and a weight ratio of about ⅙ relative to the conventional) by using the above high-frequency transformer 103. Moreover, since the inverter apparatus 400 has three lines of the neutral line n, the voltage line u, and the voltage line v as its outputs, the interconnected operation with the single-phase three-wire system distribution line of the commercial power system 130 can be implemented.

Also, the control circuit 110 controls the timing of the turn-on and -off of the switching devices S1 to S4 of the commercial-frequency inverter bridge 106 based on the direction of the transient current detected by the current detector 109 by a slight time interval. Thus, it is possible to prevent any transient current from flowing through the neutral line n with the ON-OFF timing of the switching devices shifted due to variations in the characteristics of the switching devices.

Fifth Embodiment

Figure 13:
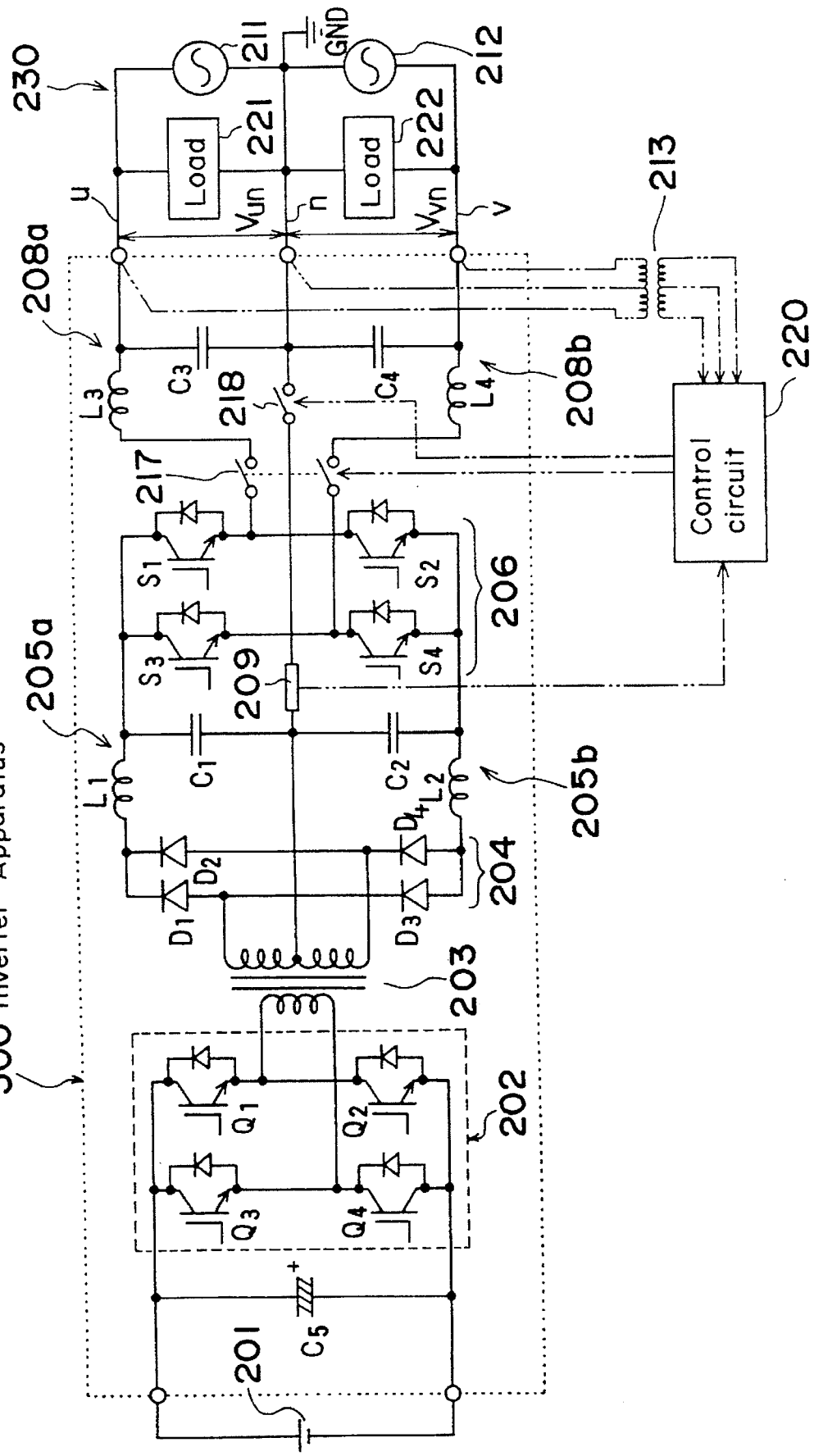
FIG. 13 is a main-part arrangement view of an inverter apparatus according to a fifth embodiment of the present invention.
Figure 14:
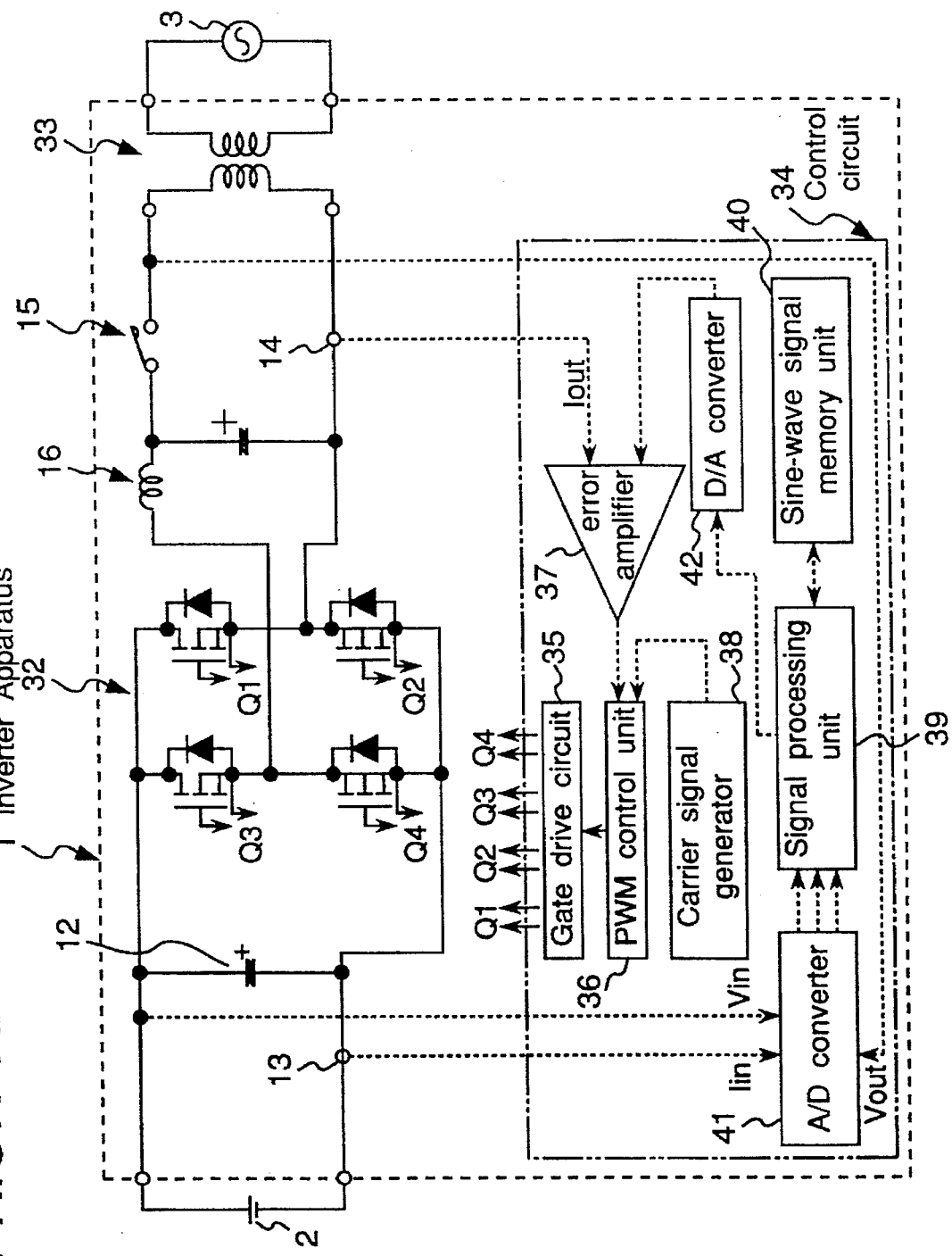
FIG. 14 is a block diagram of a conventional inverter apparatus.
Figure 15A:
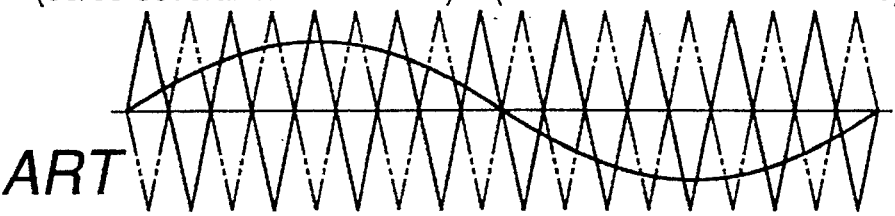
FIG. 15A shows waveforms of a sine-wave signal and a carrier signal, FIGS. 15B, 15C, 15D, . . . , 15E show waveforms of pulse train signals.
Figure 15B:
FIG. 15F shows a waveform of a signal to be applied to the power-frequency transformer, where these FIGS. 15A, 15B, . . . , 15F illustrate the conventional generation of pulse train signals through a comparison between sine-wave signal and carrier signal.
Figure 15C:
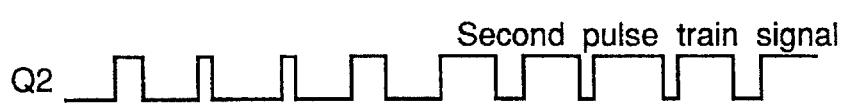
Figure 15D:
Figure 15E:
Figure 15F:
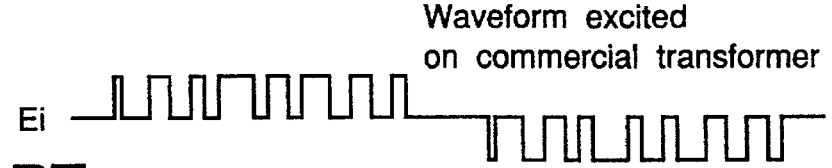
Figure 16:
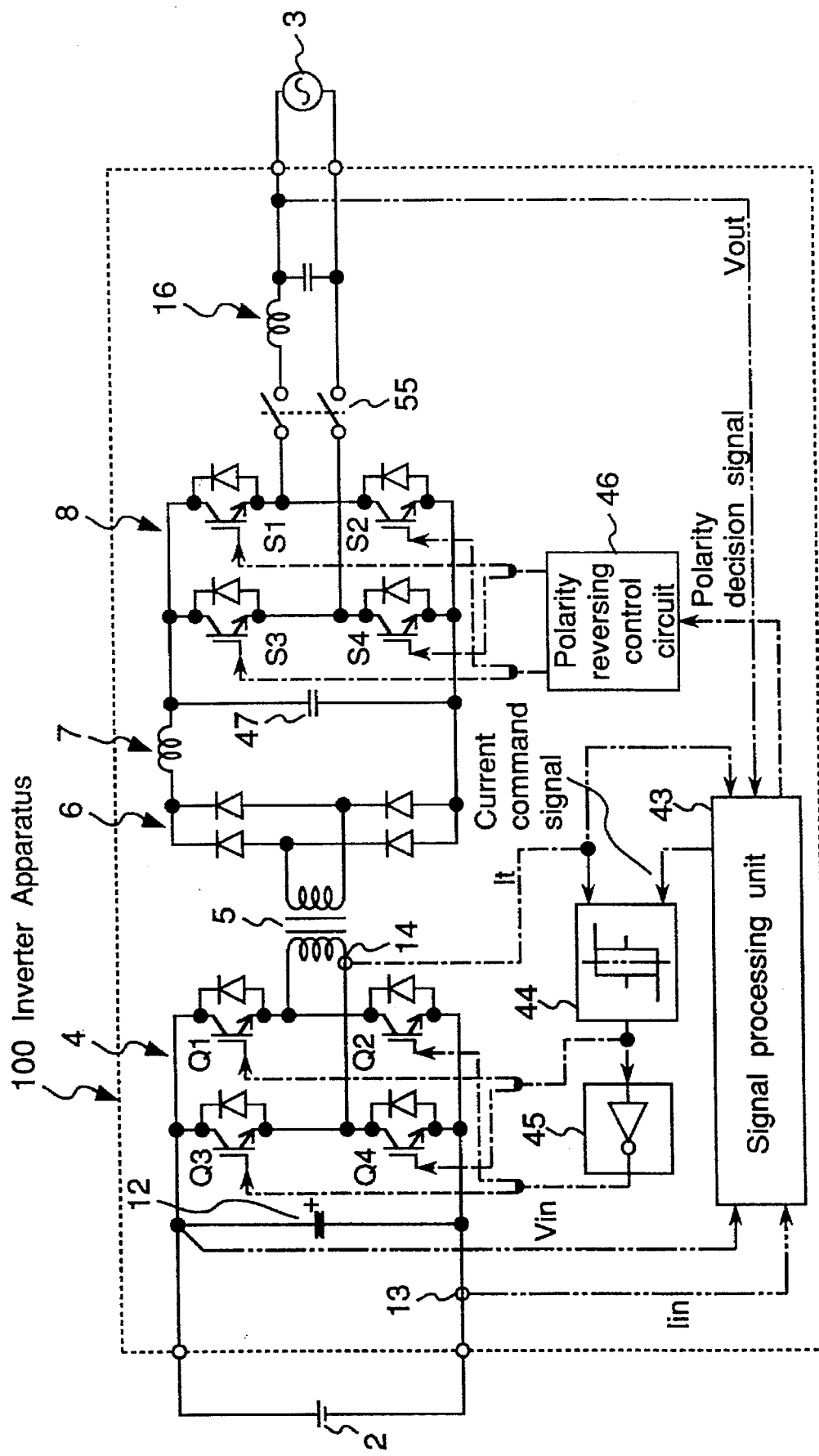
FIG. 16 is a block diagram of the conventional inverter apparatus.
Figure 17:
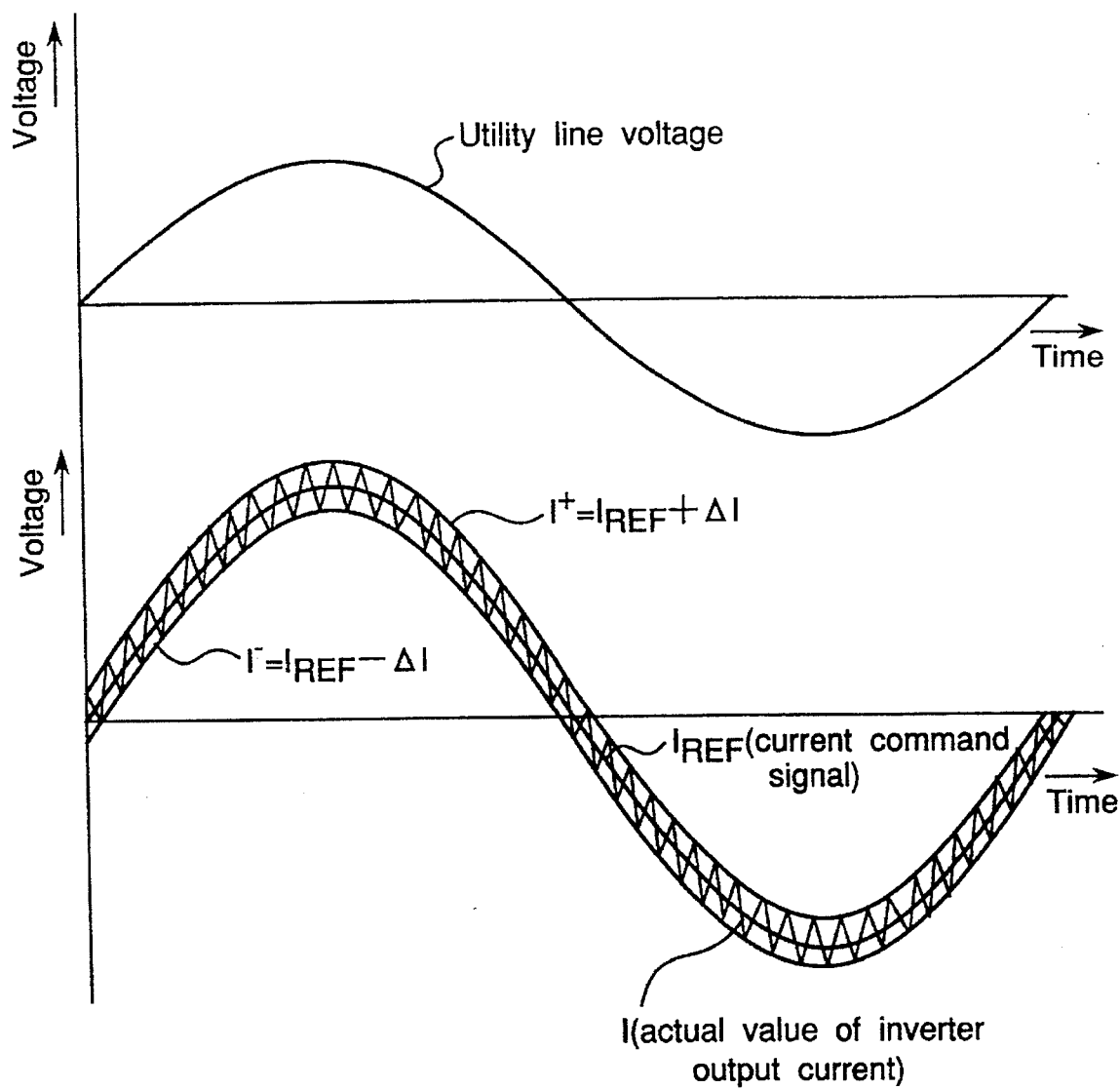
FIG. 17 is a view for explaining the waveform of the conventional example.

FIG. 13 shows the main-part arrangement of an inverter apparatus 500 of a fifth embodiment of the present invention. In addition to the arrangement of the inverter apparatus 400 of the fourth embodiment, a circuit breaker 218 is provided instead of the interconnection relay between the center tap of a high-frequency transformer 203 and a neutral line n of the single-phase three-wire system distribution line of a commercial power system 230. Also, a load 221 is connected between a voltage line u and the neutral line n of the single-phase three-wire system distribution line of the commercial power system 230, while a load 222 is connected between a voltage line v and the neutral line n. As a means for detecting that the loads 221, 222 have become unbalanced, a current detector 209 detects that an overcurrent has flowed through the neutral line n of the single-phase three-wire system distribution line connected to the center tap of the high-frequency transformer 203. Also, as a means for detecting that the above unbalanced state has been resolved, there is provided a voltage detector 213 for detecting both a line voltage $V_{un}$ between the voltage line u and the neutral line n of the single-phase three-wire system distribution line and a line voltage $V_{vn}$ between the voltage line v and the neutral line n. A control circuit 220 is further provided as a second control unit for deciding whether the loads are balanced or unbalanced, based on the line voltages $V_{un}$, $V_{vn}$ derived from the voltage detector 213 to control the opening and closing of the circuit breaker 218. It is noted that like components are designated by like reference numerals in connection with the inverter apparatus 400 and their description is omitted.

In the inverter apparatus 500 with the above arrangement, in interconnected operation with its output terminal connected to the single-phase three-wire system distribution line of the commercial power system 230, when the loads 221, 222 come into an increasingly unbalanced state, the control circuit 220 decides whether or not the signal representing a transient current derived from the current detector 209 is greater than a predetermined set value. If it is decided that the signal representing the transient current is greater than the set value, the control circuit 220 outputs a control signal representing the opening to the circuit breaker 218. Then, the circuit breaker 218 is opened so that the connection between the inverter apparatus 500 and the neutral line n is shut off, with the result that the inverter apparatus 500 is connected only to the voltage lines u and v, where the interconnected operation with the commercial power system 230 is performed with single-phase two wires, 200 V.

On the other hand, while the inverter apparatus 500 is running an interconnected operation with single-phase two wires, 200 V of the voltage lines u and v of the commercial power system 230 with the circuit breaker 218 opened as described above, the voltage detector 213 detects the line voltage $V_{un}$ between the voltage line u and the neutral line n, and the line voltage $V_{vn}$ between the voltage line v and the neutral line n, which are the line voltages across the loads 221, 222. Receiving signals representing the line voltages $V_{un}$ and $V_{vn}$ derived from the voltage detector 213, the control circuit 220 decides that the voltage difference between the line voltages $V_{un}$ and $V_{vn}$ is not more than a predetermined set value, and then outputs a control signal representing the closing to the circuit breaker 218. Then, the circuit breaker 218 is closed so that the inverter apparatus 500, which has been running an interconnected operation with single-phase two wires, 200 V, can return again to the interconnected operation with the commercial power system 230 and the single-phase three wires. In addition, the circuit breaker 218 is closed by detecting the voltage difference of the line voltage $V_{un}$ between the voltage line u and neutral line n from the line voltage $V_{vn}$ between the voltage line v and neutral line n, based on the fact that a reduced voltage difference makes it possible to decide that the load unbalanced state has been resolved. In addition, the control circuit 220 has a constitution similar to the control circuit 9 of FIG. 2, and functions as shown in FIG. 3.

From the above description, when interconnected operation with the commercial power system 230 is done by the single-phase three-wire system distribution line in normal operation, the inverter apparatus 500 can continue the interconnected operation with the single-phase two wires, 200 V by disconnecting only the neutral line n of the single-phase three wires from the inverter apparatus 500 when the loads 211, 222 connected between the neutral line n of the commercial power system 230 and the individual voltage lines become unbalanced. Accordingly, even if the loads 221, 222 have become unbalanced, the interconnected operation is never halted, so that efficient power supply can be ensured for the commercial power system 230.

Although the solar cells 101, 201 have been employed in the fourth and fifth embodiments, the DC power supply is not limited to those but may of course be a DC power supply such as a fuel cell.

Also, although the high-frequency transformers 103, 203 have been provided with the center tap at generally the center of the secondary side winding in the fourth and fifth embodiments, yet the transformer may be provided with two secondary windings, where the winding start of one winding and the winding end of the other may be connected to each other and the resulting connecting point may be the center tap.

Although the filter circuits 205a, 205b composed of the reactors $L_1$, $L_2$ and the capacitors $C_1$, $C_2$ have been used in the fourth and fifth embodiments, the low-pass filters are not limited to these, but may be another if it can remove high-frequency components superimposed on the DC voltage derived from the second power conversion unit. That is, the filter circuits may be those composed of only reactors whose one end is connected to the output terminal of the second power conversion unit.

In the above fifth embodiment, a current detector 209 inserted between the center tap of the high-frequency transformer 203 and the neutral line n has been used as a means for detecting any load unbalanced state to detect an overcurrent flowing through the neutral line n. However, without being limited to this arrangement, any unbalanced state of loads may also be detected by detecting a voltage difference of line voltages between the neutral line and the individual voltage lines by using a voltage detector and by deciding whether or not the voltage difference is greater than a specified value.

As will be clear from the foregoing description, the inverter apparatus of the present invention adopts an inverter control method in which the primary side of the high-frequency transformer is excited by a high-frequency alternating current which has a pulse-width modulated pulse train inverted alternately of the positive and negative polarity and which is equal in frequency to the carrier signal. As a result, the secondary-side output waveform of the high-frequency transformer also has a high-frequency AC waveform having a pulse-width modulated pulse train inverted alternately of the positive and negative polarity. Accordingly, the diode bridge provided at the succeeding stage of the high-frequency transformer rectifies the pulse-width modulated, alternately positive-negative inverted pulse train signal, whereby a PWM pulse train waveform continuous on the positive side is obtained. Then, the waveform is smoothed by the DC reactor provided at the succeeding stage of the diode bridge, whereby high-frequency components are removed. Thus, a DC waveform similar to one which results from full-wave rectifying a sine-wave AC waveform of the same frequency as the sine-wave signal can be obtained. Further, in the commercial-frequency inverter bridge at the succeeding stage, fold-back control is performed in which a DC waveform similar to the result of full-wave rectifying the sine-wave AC waveform is inverted alternately of the positive and negative polarity, whereby a sine-wave AC waveform can be obtained.

According to the present invention, it becomes possible to use a high-frequency transformer which is about 1/30 in capacity ratio and about 1/20 in weight ratio, instead of the power-frequency transformer. Thus, the inverter apparatus can be reduced in size and weight as compared with the method using a power-frequency transformer.

Further, it becomes possible to obtain a sine-wave AC waveform reduced in distortion similar to the waveform output by the conventional PWM control with quite a simple construction in which, for example, only gate processing of exclusive OR operation is added to the conventional PWM control.

It is also possible to realize an inverter apparatus of the high-frequency insulation type capable of interconnection with the single-phase three-wire system distribution line of the commercial power system by the same electrical method.

Also, the inverter apparatus of the above embodiment is an interconnection type inverter for converting DC power fed from a DC power supply into AC power and supplying the power to the single-phase three-wire system distribution line having two voltage lines and a neutral line of the commercial power system, wherein the DC power derived from the DC power supply is converted into AC power by a first power conversion unit, an AC voltage derived from the first power conversion unit is transformed by a transformer, the transformed AC voltage is outputted from the secondary-side output terminal, and a center tap provided at generally the midpoint of the winding of the secondary-side output terminal of the transformer is connected to the neutral line of the single-phase three-wire system distribution line, and wherein AC power derived from the secondary-side output terminal of the transformer is converted into DC power by a second power conversion unit, high-frequency components superimposed on the DC voltage derived from the second power conversion unit are removed by filter circuits, a third power conversion unit converts DC power derived from the filter circuits into AC power, and the inverter apparatus is connected to the commercial power system with the three lines of two voltage lines and a neutral line of the single-phase three-wire system distribution line.

Therefore, according to the inverter apparatus of the above embodiment, the inverter apparatus can be reduced in size and weight and besides interconnected operation can be implemented with the single-phase three-wire system distribution line, which is adopted in most newly built residential houses.

Also, according to the inverter apparatus of one embodiment, the filter circuits are respectively composed of a reactor whose one end is connected to one of two DC voltage output terminals of the second power conversion unit, and a capacitor connected between the other end of the reactor and the center tap of the transformer.

Therefore, according to the inverter apparatus of the above embodiment, the filter circuits remove high-frequency components superimposed on the individual DC voltages between the two DC voltage output terminals of the second power conversion unit and the center tap of the transformer. As a result, waveform shaping can be implemented by removing high-frequency components of the DC voltages derived from the second power conversion unit by filter circuits of simple construction.

Also, in the inverter apparatus of one embodiment, a transient current is detected by a current detector provided between the secondary-side center tap of the transformer and the neutral line of the single-phase three-wire system distribution line, and the first control unit performs ON-OFF control on the switching devices provided in the third power conversion unit for converting DC power into AC power based on the direction of the transient current detected by the current detector, so that the above transient current will not flow.

According to the inverter apparatus of the above embodiment, any transient current can be prevented from flowing through the neutral line of the single-phase three-wire system distribution line, for example, by correcting any shift of the turn-on and -off time due to variation in the characteristics of the switching devices. Therefore, this inverter apparatus can be interconnected with the commercial power system by stable AC voltage output with less distortion.

In the inverter apparatus of one embodiment, the voltage detector detects line voltages between the neutral line and two voltage lines of the single-phase three-wire system distribution line, and the second control unit performs control in such a way that the circuit breaker provided between the center tap of the transformer and the neutral line of the single-phase three-wire system distribution line is opened when the transient current detected by the current detector is not less than a specified value, and that the circuit breaker is closed when the voltage difference between the individual line voltages detected by the voltage detector is smaller than the specified value.

According to the inverter apparatus of the above embodiment, even when an unbalance has taken place to the loads connected to the single-phase three-wire system distribution line, the circuit breaker is opened so that the interconnected operation with single-phase two wires (200 V) can be continued without halting the inverter apparatus, whereas the circuit breaker is closed when the loads have been restored to the balanced state, so that the interconnected operation with the single-phase three wires is restored. Thus, the output of the solar cell can be connected in inverse power flow to the commercial power system efficiently.

In the inverter apparatus of one embodiment, the voltage detector detects line voltages between the neutral line and two voltage lines of the single-phase three-wire system distribution line, and the second control unit opens the circuit breaker provided between the center tap of the transformer and the neutral line of the single-phase three-wire system distribution line when the voltage difference between the individual line voltages detected by the voltage detector is not less than a specified value, whereas it closes the circuit breaker when the voltage difference is smaller than the specified value.

According to the inverter apparatus of the above embodiment, even when an unbalanced state has taken place to the loads connected to the single-phase three-wire system distribution line, the circuit breaker is opened without halting the inverter apparatus, so that the interconnected operation with single-phase two wires (200 V) is continued. Besides, when the loads have been restored to the balanced state, the circuit breaker is closed so that the interconnected operation with the single-phase three wires is restored. Thus, the output of the solar cell can be connected in inverse power flow to the commercial power system efficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling an inverter apparatus which converts DC power generated by a DC power supply into AC power and then supplies the AC power to loads or an existing commercial power supply, the method comprising steps of:

alternately inverting positive/negative polarity of a pulse train pulse-width modulated by PWM (Pulse Width Modulation) control using a sine-wave signal of a first frequency and a carrier signal of a second frequency;

wherein said PWM control includes the steps of, generating a first pulse train signal by comparing the sine-wave signal and the carrier signal with each other and by outputting a first level when the sine-wave signal is greater than the carrier signal;

outputting a second level when the sine-wave signal is less than the carrier signal;

generating a second pulse train signal by inverting the first pulse train signal;

generating a third pulse train signal by comparing an inverted carrier signal, which is an inversion of the carrier signal, and the sine-wave signal with each other and outputting the first level when the inverted carrier signal is greater than the sine-wave signal, or outputting the second level when the inverted carrier signal is smaller than the sine-wave signal;

generating a fourth pulse train signal by inverting the third pulse train signal;

generating a rectangular-wave signal equal in frequency to said second frequency of the carrier signal and shifted in phase by a ¼ period of the carrier signal;

generating four separate pulse train signals by exclusive-ORing the rectangular-wave signal with each of the first to fourth pulse train signals;

generating an AC signal also equal in frequency to that of the carrier signal by inputting the four pulse train signals to four switching devices of an inverter bridge and by performing on-off control on the switching devices, and exciting a primary side of a transformer, insulating a DC power input from an AC power output, with said AC signal.

2. The method according to claim 1 wherein said first frequency comprises a relatively low frequency and said second frequency comprises a relatively high frequency.

3. The method according to claim 2 wherein said first frequency comprises a 50/60 Hz commercial power line frequency.

4. The method according to claim 2 wherein said second frequency comprises a frequency between about 16 kHz and about 19 kHz.

5. An inverter apparatus comprising:
- a first power conversion unit for converting DC voltage into AC voltage;
- a transformer for obtaining a transformed secondary voltage with the resulting AC voltage taken as a primary voltage;
- a second power conversion unit to which secondary-side two lines of the transformer are connected and which serves for converting AC voltage into DC voltage;
- reactors connected in series to each of two output lines of the second power conversion unit;
- a third power conversion unit connected to outputs of the reactors and converting DC voltage into AC voltage; and
- a control circuit for controlling turn-on and -off of switching devices constituting the first power conversion unit and the third power conversion unit, the control circuit comprising:
  - means for generating a sine-wave signal which is an output target value of the inverter apparatus;
  - means for generating a carrier signal for performing PWM control using the sine-wave signal;
  - means for generating a rectangular-wave signal equal in frequency to the carrier signal and shifted in phase by a ¼ period;
  - pulse train signal generating means for generating a first pulse train signal by comparing the sine-wave signal and the carrier signal with each other and by outputting a first level when the sine-wave signal is greater than the carrier signal, or outputting a second level when the sine-wave signal is smaller than the carrier signal; generating a second pulse train signal by inverting the first pulse train signal; generating a third pulse train signal by comparing an inverted carrier signal, which is an inversion of the carrier signal, and the sine-wave signal with each other and by outputting the first level when the inverted carrier signal is greater than the sine-wave signal, or outputting the second level when the inverted carrier signal is smaller than the sine-wave signal; and generating a fourth pulse train signal by inverting the third pulse train signal;
  - means for gating the first to fourth pulse train signals with the rectangular-wave signal; and
  - means for performing ON-OFF control on the switching devices constituting the first power conversion unit with the gated pulse train signals.

6. The inverter apparatus according to claim 5, wherein a center tap is further provided on the secondary side of the transformer, a line derived from the center tap is connected to a neutral line of a low-voltage single-phase three-wire system utility line, the reactors are connected to the two output lines of the second power conversion unit, capacitors are connected up-and-down symmetrically between the two output lines and the line derived from the center tap, and wherein two output lines of the third power conversion unit are connected to lines of the low-voltage single-phase three-wire system distribution line other than the neutral line.

7. The inverter apparatus according to claim 6, further comprising: a current detector provided between the secondary-side center tap of the transformer and the neutral line of the single-phase three-wire system distribution line and detecting a transient current; and a first control unit for performing ON-OFF control on switching devices provided in the third power conversion unit for converting DC power into AC power so that the transient current will not flow, based on a direction of the transient current detected by the current detector.

8. The inverter apparatus according to claim 7, further comprising: a voltage detector for detecting line voltages between the neutral line and the two voltage lines of the single-phase three-wire system distribution line; a circuit breaker provided between the center tap of the transformer and the neutral line of the single-phase three-wire system distribution line; and a second control unit for performing control so as to open the circuit breaker when the transient current detected by the current detector is equal to or greater than a specified value, and to close the circuit breaker when a voltage difference between the line voltages detected by the voltage detector is smaller than the specified value.

9. The inverter apparatus according to claim 6, further comprising: a voltage detector for detecting line voltages between the neutral line and the two voltage lines of the single-phase three-wire system distribution line; a circuit breaker provided between the center tap of the transformer and the neutral line of the single-phase three-wire system distribution line; and a second control unit for performing control so as to open the circuit breaker when a voltage difference between the line voltages detected by the voltage detector is equal to or greater than a specified value, and to close the circuit breaker when the voltage difference is smaller than the specified value.

10. An interconnection type inverter apparatus for converting DC power fed from a DC power supply into AC power and supplying the AC power to a single-phase three-wire system distribution line having two voltage lines and a neutral line of a commercial power system, the inverter apparatus comprising:
- a first power conversion unit including a plurality of switching devices for converting the DC power derived from the DC power supply into AC power;
- a transformer coupled to the first power conversion unit for transforming the resulting AC voltage derived from the first power conversion unit and outputting the transformed AC voltage from secondary-side output terminals of the transformer, in which a center tap provided at a generally midpoint of a winding coupled to the secondary-side output terminals is connected to a neutral line of a single-phase three-wire system distribution line;
- a second power conversion unit for converting AC power derived from the secondary-side output terminals of the high frequency transformer into DC power;
- a pair of filter circuits respectively connected from the second power conversion unit to the center tap of the transformer for removing high-frequency components superimposed on the DC voltage derived from the second power conversion unit;
- a third power conversion unit including a plurality of switching devices and coupled to the second power conversion unit via the pair of filter circuits for converting DC power from the second power into AC power, the third power conversion unit having output terminals respectively connected to two voltage lines of the single-phase three-wire system distribution line; and a control circuit for controlling turn-on and turn-off of the plurality of switching devices of the first and third power conversion unit.

11. The inverter apparatus according to claim 10, wherein the pair of filter circuits are respectively comprised of a reactor having one end connected to one of the DC voltage output terminals of the second power conversion unit, and a capacitor connected between the other end of the reactor and the center tap of the transformer.

12. The apparatus according to claim 10 wherein first power conversion unit comprises a high frequency DC to AC inverter circuit, said second power conversion unit comprises an AC to DC rectifier circuit, and said third power conversion unit comprises a low frequency DC to AC circuit.

13. The apparatus according to claim 10 wherein said control circuit comprises:

means for generating a sine-wave signal;

means for generating a carrier signal for performing PWM control using the sine-wave signal;

means for generating a rectangular-wave signal equal in frequency to the carrier signal and shifted in phase by a ¼ period;

means for generating a plurality of pulse train signals;

means for gating the pulse train signals with the rectangular-wave signal; and means for performing on-off control on the switching devices of the first power conversion unit with the gated pulse train signals.

14. The apparatus according to claim 13 wherein the pulse train signal generating means comprises:

means for generating a first pulse train signal by comparing the sine-wave signal and the carrier signal with each other and by outputting a first level when the sine-wave signal is greater than the carrier signal, or outputting a second level when the sine-wave signal is smaller than the carrier signal;

means for generating a second pulse train signal by inverting the first pulse train signal;

means for generating a third pulse train signal by comparing an inverted carrier signal, which is an inversion of the carrier signal, and the sine-wave signal with each other and by outputting the first level when the inverted carrier signal is greater than the sine-wave signal, or outputting the second level when the inverted carrier signal is smaller than the sine-wave signal; and means for generating a fourth pulse train signal by inverting the third pulse train signal.

15. Apparatus for controlling a DC to AC inverter including a plurality of switching devices, comprising:

means for generating a sine-wave signal of a first frequency;

means for generating a carrier signal of a second frequency;

means for generating a first pulse train signal by comparing the sine-wave signal and the carrier signal with each other and outputting a first level when the sine-wave signal is greater than the carrier signal and outputting a second level when the sine-wave signal is less than the carrier signal;

means for generating a second pulse train signal by inverting the first pulse train signal;

means for generating a third pulse train signal by comparing an inverted carrier signal, which is an inversion of the carrier signal, and the sine-wave signal with each other and outputting the first level when the inverted carrier signal is greater than the sine-wave signal, and outputting the second level when the inverted carrier signal is smaller than the sine-wave signal;

means for generating a fourth pulse train signal by inverting the third pulse train signal;

means for generating a rectangular-wave signal equal in frequency to said second frequency of the carrier signal and shifted in phase by a ¼ period of the carrier signal;

a plurality of exclusive OR logic gates for generating four separate pulse train signals by exclusive-ORing the rectangular-wave signal with each of the first to fourth pulse train signals; and means for generating an AC signal equal in frequency to that of the carrier signal by inputting the pulse train signals to the switching devices and by performing on-off control on the switching devices.

16. The apparatus according to claim 15 wherein the first frequency comprises a relatively low frequency and the second frequency comprises a relatively high frequency.

17. The apparatus according to claim 15 wherein the first frequency comprises a frequency in the range between about 50 Hz and about 60 Hz and the second frequency comprises a frequency in the range between about 16 kHz and about 19 kHz.

18. The apparatus according to claim 15 wherein said switching devices comprise at least four switching devices of a bridge type inverter.

19. The apparatus according to claim 18 wherein said switching device comprises semiconductor switch devices.

* * * * *